(12) United States Patent
Matsumoto et al.

(10) Patent No.: US 8,400,762 B2
(45) Date of Patent: Mar. 19, 2013

(54) DISPLAY DEVICE

(75) Inventors: Kouji Matsumoto, Osaka (JP);
Takafumi Hara, Kyotanabe (JP);
Takeshi Ogura, Osaka (JP); Kohji Hisakawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 269 days.

(21) Appl. No.: 12/742,047

(22) PCT Filed: Sep. 29, 2008

(86) PCT No.: PCT/JP2008/067634
§ 371 (c)(1),
(2), (4) Date: Jun. 18, 2010

(87) PCT Pub. No.: WO2009/060675
PCT Pub. Date: May 14, 2009

(65) Prior Publication Data
US 2010/0296233 A1   Nov. 25, 2010

(30) Foreign Application Priority Data

| Nov. 8, 2007 | (JP) | 2007-291148 |
| Apr. 22, 2008 | (JP) | 2008-111633 |
| Jul. 31, 2008 | (JP) | 2008-198786 |

(51) Int. Cl.
*H05K 5/00* (2006.01)
*H05K 7/00* (2006.01)
(52) U.S. Cl. ................................ 361/679.21
(58) Field of Classification Search ............. 361/679.21
See application file for complete search history.

(56) References Cited

U.S. PATENT DOCUMENTS

| 6,175,396 | B1 | 1/2001 | Kim et al. |
| 2005/0243505 | A1* | 11/2005 | Jackson, Jr. .............. 361/683 |
| 2005/0264986 | A1* | 12/2005 | Kee et al. .................. 361/681 |
| 2007/0097613 | A1* | 5/2007 | Tracy et al. .............. 361/683 |

FOREIGN PATENT DOCUMENTS

| JP | 61-32882 A | 2/1986 |
| JP | 61-184384 U | 11/1986 |
| JP | 3-211586 A | 9/1991 |
| JP | 7-28056 A | 1/1995 |
| JP | 8-76694 A | 3/1996 |
| JP | 10-143092 A | 5/1998 |
| JP | 10-207385 A | 8/1998 |
| JP | 11-281966 A | 10/1999 |
| JP | 2001-125072 A | 5/2001 |
| JP | 2002-72917 A | 3/2002 |
| JP | 2004-272045 A | 9/2004 |
| JP | 2004-341468 A | 12/2004 |
| JP | 2007-232937 A | 9/2007 |

* cited by examiner

*Primary Examiner* — Anthony Haughton
(74) *Attorney, Agent, or Firm* — Birch, Stewart, Kolasch & Birch, LLP

(57) ABSTRACT

An optical sheet that diffuses light is disposed on the front side of a backlight chassis supporting a fluorescent tube, a frame supporting a display panel that displays images is provided on the front side of the optical sheet, a bezel is provided on the front side of the frame, the bezel, the display panel, the frame and the optical sheet are coupled, and the bezel, the display panel, the frame and the optical sheet constitute a unit. A first reinforcing member is provided along one side of the optical sheet, a second reinforcing member opposed to the first reinforcing member is provided along one side of the backlight chassis, and a pivotal member is provided between the first reinforcing member and the second reinforcing member.

17 Claims, 24 Drawing Sheets

DISPLAY DEVICE

This application is the national phase under 35 U. S. C. §371 of PCT International Application No. PCT/JP2008/067634 which has an International filing date of Sep. 29, 2008 and designated the United States of America.

BACKGROUND OF THE INVENTION

1. Technical Field

The present invention relates to a display device for displaying images.

2. Description of Related Art

A liquid crystal display device has previously been proposed in which an optical sheet that diffuses light, a frame that supports a display panel, the display panel that displays images and a bezel that fixes the display panel to the frame are provided in this order on the front side of a luminous body supported by a supporting portion. In the liquid crystal display device, when the end of the service life of the luminous body is reached, the bezel, the display panel, the frame and the optical sheet are successively detached to replace the luminous body (see Japanese Patent Application Laid-Open No. H10-143092).

Moreover, various apparatuses incorporating the liquid crystal display device have conventionally been proposed. Japanese Patent Application Laid-Open No. 2002-72917 discloses an operation panel for an NC machine tool provided with a liquid crystal display device and a numerical controller. The luminous body of the liquid crystal display device of the operation panel is disposed opposite to the numerical controller. A side portion of the liquid crystal display device and a side portion of the numerical controller are coupled through a rotatable shaft. When the end of the service life of the luminous body is reached, to replace the luminous body, the liquid crystal display device and the numerical controller are separated with the shaft as the center to thereby expose the luminous body in a short time without detaching the liquid crystal display device.

SUMMARY OF THE INVENTION

In the case of the liquid crystal display device described in Japanese Patent Application Laid-Open No. H10-143092, not only it is necessary to secure a place for putting the detached bezel, display panel, frame and optical sheet every time the luminous body is replaced but also it takes a long time to detach the bezel, the display panel, the frame and the optical sheet. In the case of a large-size liquid crystal display device, since the above-mentioned parts are also large, many hands are required to detach them. Moreover, in the case of the liquid crystal display device of the operation panel, to replace a part disposed inside the liquid crystal display device, it is necessary to take a long time to disassemble the liquid crystal display device.

The present invention is made in view of the above-mentioned circumstance, and an object thereof is to provide a display device in which by providing a pivotal member that couples a display panel for displaying images and a support portion that supports the display panel, the display panel and the support portion are separated without the display panel being detached and this enables the replacement or the maintenance of a part disposed between the display panel and the support portion to be performed in a short time by a small number of persons.

In a display device according to the present invention provided with a display panel that displays an image; and a support portion that supports the display panel, a pivotal member is provided that couples the display panel and the support portion so that the display panel pivots on a side portion of the display panel.

According to the present invention, by providing a pivotal member that couples the display panel for displaying images and the support portion that supports the display panel, the display panel and the support portion are separated without the display panel being detached. Then, the replacement or the maintenance of a part provided in the support portion is performed.

In a display device according to the present invention, a rod member is provided on the side portion of the display panel or on a part of the support portion opposed to the side portion of the display panel, and the pivotal member is coupled to the rod member.

According to the present invention, by providing the rod member on the side portion of the display panel or on the part of the support portion opposed to the side portion of the display panel and coupling the pivotal member to the rod member, the display device can be prevented from being deformed by the weight of the display panel by loading the rod member with the weight of the display panel when the display panel and the support portion are separated.

In a display device according to the present invention, a restricting member is provided that restricts pivoting of the display panel.

According to the present invention, when neither the replacement nor the maintenance of a part disposed opposite to the display panel is performed, the pivoting of the display panel is restricted by the restricting member, and only when the replacement or the maintenance of the part disposed opposite to the display panel is performed, the display panel is pivoted.

In a display device according to the present invention, a positioning member is provided that aligns positions of the display panel and the support portion.

According to the present invention, when the replacement or the maintenance of the part is finished and the display panel is brought close to the support portion, the positions of the display panel and the support portion are aligned by the positioning member.

In a display device according to the present invention, the support portion includes a chassis that supports a luminous body, and an optical sheet that diffuses light of the luminous body is disposed between the display panel and the chassis.

According to the present invention, when the replacement or the maintenance of the optical sheet is performed, the display panel is separated from the chassis to thereby expose the optical sheet.

In a display device according to the present invention, the optical sheet is coupled to the pivotal member.

According to the present invention, the optical sheet is coupled to the pivotal member, and when the luminous body supported by the chassis is replaced, the optical sheet and the chassis are separated to thereby expose the optical sheet.

In a display device according to the present invention, the support portion includes a cabinet situated on a back side of the chassis.

According to the present invention, the cabinet situated on the back side of the chassis is coupled to the pivotal member, and the cabinet and the chassis are separated. Thereby, a part disposed between the cabinet and the chassis, for example, a circuit board attached to the back side of the chassis is replaced.

In a display device according to the present invention, the chassis includes: a first chassis portion for attaching the luminous body; and a second chassis portion opposed to the first chassis portion.

According to the present invention, the first chassis portion is pivoted to thereby separate the first chassis portion and the second chassis portion. Thereby, a part disposed between the first chassis portion and the second chassis portion, for example, a circuit board attached to the second chassis portion is replaced.

In a display device according to the present invention, a chassis restricting member is provided that restricts pivoting of the first chassis portion.

According to the present invention, when neither the replacement nor the maintenance of the part disposed between the first chassis portion and the second chassis portion is performed, the pivoting of the first chassis portion is restricted by the chassis restricting member, and only when the replacement or the maintenance of the part disposed between the first chassis portion and the second chassis portion is performed, the first chassis portion is pivoted.

In a display device according to the present invention, a chassis alignment member is provided that aligns positions of the first chassis portion and the second chassis portion.

According to the present invention, when the first chassis portion and the second chassis portion are brought close to each other, the positions of the first chassis portion and the second chassis portion are aligned by the chassis alignment member.

In a display device according to the present invention, the chassis is rectangular, a rectangular cabinet opposed to the chassis is provided, and a coupling member is provided that couples a side portion of the cabinet and a side portion of the chassis opposed to the side portion of the cabinet so as to be pivotable.

According to the present invention, the rectangular chassis and the rectangular cabinet are opposed to each other, and the side portion of the cabinet and the side portion of the chassis are coupled through the coupling member so as to be pivotable. Consequently, the chassis is pivoted to thereby separate the cabinet and the chassis, and a part disposed between the cabinet and the chassis, for example, a circuit board attached to the chassis is replaced.

In a display device according to the present invention, the following are provided: a leg portion attached to the support portion; and an attachment/detachment portion for attaching and detaching the leg portion.

According to the present invention, by providing the support portion with the attachment/detachment portion for attaching and detaching the leg portion, when the luminous body, the optical sheet and the like are replaced, the leg portion is attached to the attachment/detachment portion, the pivotal member is pivoted, and the display panel, the optical sheet and the like detached from the support portion is supported by the leg portion. When the replacement of the luminous body, the optical sheet or the like is finished and the display panel, the optical sheet and the like are fixed to the support portion, the leg portion is detached.

In a display device according to the present invention, a rolling member is provided on an end portion of the leg portion.

According to the present invention, by providing the rolling member, for example, a caster on the end portion of the leg portion, the display panel, the optical sheet and the like can be smoothly brought into contact with and separated from the support portion.

In a display device according to the present invention provided with: a frame body provided on a front side of a display panel that displays an image; a panel support body that is provided on a back side of the display panel and supports the display panel; a chassis that is provided on a back side of the panel support body and supports a luminous body; and an optical sheet that diffuses light of the luminous body and irradiates the display panel with the light, the frame body, the display panel, the panel support body and the optical sheet are coupled, and the following are provided: a first rod member along an edge portion of the optical sheet; a second rod member along an edge portion of the chassis and opposed to the first rod member; and a pivotal member that couples the first rod member and the second rod member so that the optical sheet pivots on a side of the first rod member.

According to the present invention, the frame body provided on the front side of the display panel, the panel support body that is provided on the back side of the display panel and supports the display panel and the optical sheet that is provided on the back side of the panel support body, diffuses light of the luminous body and irradiates the display panel with the light are coupled into a unit, the chassis that supports the luminous body is provided on the back side of the optical sheet, the first rod member is provided along the edge portion of the optical sheet, the second rod member is provided along the edge portion of the chassis and opposed to the first rod member, and the pivotal member is provided that couples the first rod member and the second rod member. Thereby, when the luminous body is replaced, the frame body, the display panel, the panel support body and the optical sheet (hereinafter, the frame body, the display panel, the panel support body and the optical sheet will be referred to as the display panel and the like) are pivoted on the first rod member side to thereby separate the display panel and the like from the chassis, the luminous body is replaced under a condition where the display panel and the like are separated, and when the replacement of the luminous body is finished, the display panel and the like are brought close to the chassis.

In a display device according to the present invention, the pivotal member includes: a first fixed portion having a through hole and fixed to a second rod member side of the first rod member; a second fixed portion having a through hole and fixed to a first rod member side of the second rod member; a concave portion provided on a second rod member side of the first fixed portion and/or a first rod member side of the second fixed portion; and a shaft member that is inserted in the through holes formed in the first fixed portion and the second fixed portion to thereby couple the first fixed portion and the second fixed portion while one of the first fixed portion and the second fixed portion is disposed in the concave portion provided on the other of the first fixed portion and the second fixed portion.

According to the present invention, the first fixed portion is fixed to the second rod member side of the first rod member, a through hole is formed in the first fixed portion, the second fixed portion is fixed to the first rod member side of the second rod member, a through hole is formed in the second fixed portion, the concave portion is provided on the second rod member side of the first fixed portion and/or the first rod member side of the second fixed portion, one of the first fixed portion and the second fixed portion is disposed in the concave portion, and the shaft member is inserted in the through holes formed in the first fixed portion and the second fixed portion to thereby couple the first fixed portion and the second fixed portion. Thereby, when the luminous body is replaced, the display panel and the like are pivoted on the first rod member side to thereby separate the display panel and the like from the chassis, the luminous body is replaced under a condition where the display panel and the like are separated, and when the replacement of the luminous body is finished, the display panel and the like are brought close to the chassis.

In a display device according to the present invention, the pivotal member includes: a first fixed plate portion fixed to a second rod member side of the first rod member; two first extending plate portions having a through hole and extending from one edge portion of the first fixed plate portion and the other edge portion opposed to the one edge portion toward the second rod member vertically to a direction of a shaft center of the first rod member; a second fixed plate portion fixed to a first rod member side of the second rod member; two second extending plate portions having a through hole and extending from one edge portion of the second fixed plate portion and the other edge portion opposed to the one edge portion toward the first rod member vertically to a direction of a shaft center of the second rod member; and a shaft member that is inserted in the through holes of the first extending plate portion and the second extending plate portion to thereby couple the first extending plate portion and the second extending plate portion.

According to the present invention, the first fixed plate portion is fixed to the second rod member side of the first rod member, the two first extending plate portions are provided that extend from one edge portion of the first fixed plate portion and the other edge portion opposed to the one edge portion toward the second rod member vertically to the direction of the shaft center of the first rod member, a through hole is formed in the first extending plate portion, the second fixed plate portion is fixed to the first rod member side of the second rod member, the two second extending plate portions are provided that extend from one edge portion of the second fixed plate portion and the other edge portion opposed to the one edge portion toward the first rod member vertically to the direction of the shaft center of the second rod member, a through hole is formed in the second extending plate portion, and the shaft member is inserted in the through holes of the first extending plate portion and the second extending plate portion to thereby couple the first extending plate portion and the second extending plate portion. Thereby, when the luminous body is replaced, the display panel and the like are pivoted on the first rod member side to thereby separate the display panel and the like from the chassis, the luminous body is replaced under a condition where the display panel and the like are separated, and when the replacement of the luminous body is finished, the display panel and the like are brought close to the chassis.

In a display device according to the present invention, the following are provided: a leg portion attached to the panel support body; and an attachment/detachment portion for attaching and detaching the leg portion.

According to the present invention, by providing the panel support body with the attachment/detaching portion for attaching and detaching the leg portion, when the luminous body is replaced, the leg portion is attached to the attachment/detachment portion, the pivotal member is pivoted, the display panel and the like separated from the chassis are supported by the leg portion, and when the replacement of the luminous body is finished and the display panel and the like are fixed to the chassis, the leg portion is detached.

In a display device according to the present invention, a rolling member is provided on an end portion of the leg portion.

According to the present invention, by providing the rolling member, for example, a caster on the end portion of the leg portion, the display panel and the like can be smoothly brought into contact with and separated from the chassis.

In a display device according to the present invention, the first rod member and the second rod member are cylindrical.

According to the present invention, the first rod member and the second rod member are cylindrical, so that the strength of the first rod member and the second rod member can be improved.

Effect of the Invention

In the display device according to the present invention, by providing the pivotal member that couples the display panel for displaying images and the support portion that supports the display panel, the display panel and the support portion are separated without the display panel being detached. Then, the replacement or the maintenance of a part provided in the support portion is performed. For example, in the liquid crystal display device, the display panel and the backlight chassis are separated, and the luminous body attached to the backlight chassis can be replaced by a small number of persons in a short time without the display panel being detached.

Moreover, the frame body provided on the front side of the display panel, the panel support body that is provided on the back side of the display panel and supports the display panel and the optical sheet that is provided on the back side of the panel support body, diffuses light of the luminous body and irradiates the display panel with the light are integrally coupled (hereinafter, the integrally coupled frame body, display panel, panel support body and optical sheet will be referred to as the display panel and the like), the chassis that supports the luminous body is provided on the back side of the optical sheet, the first rod member is provided along the edge portion of the optical sheet, the second rod member is provided along the edge portion of the chassis and opposed to the first rod member, and the pivotal member is provided that couples the first rod member and the second rod member. Thereby, when the luminous body is replaced, the display panel and the like are pivoted on the first rod member side, the luminous body is replaced under a condition where the display panel and the like are separated from the chassis, and when the replacement of the luminous body is finished, the display panel and the like are brought close to the chassis. Consequently, the luminous body can be replaced by a small number of persons in a short time without the display panel and the like being detached. Moreover, the chassis can be prevented from being deformed by the weight of the display panel and the like by loading the first rod member and the second rod member with the weight of the display panel and the like when the display panel and the like are pivoted.

The above and further objects and features will more fully be apparent from the following detailed description with accompanying drawings.

DETAILED DESCRIPTION OF THE INVENTION (First Embodiment)

Figure 1:
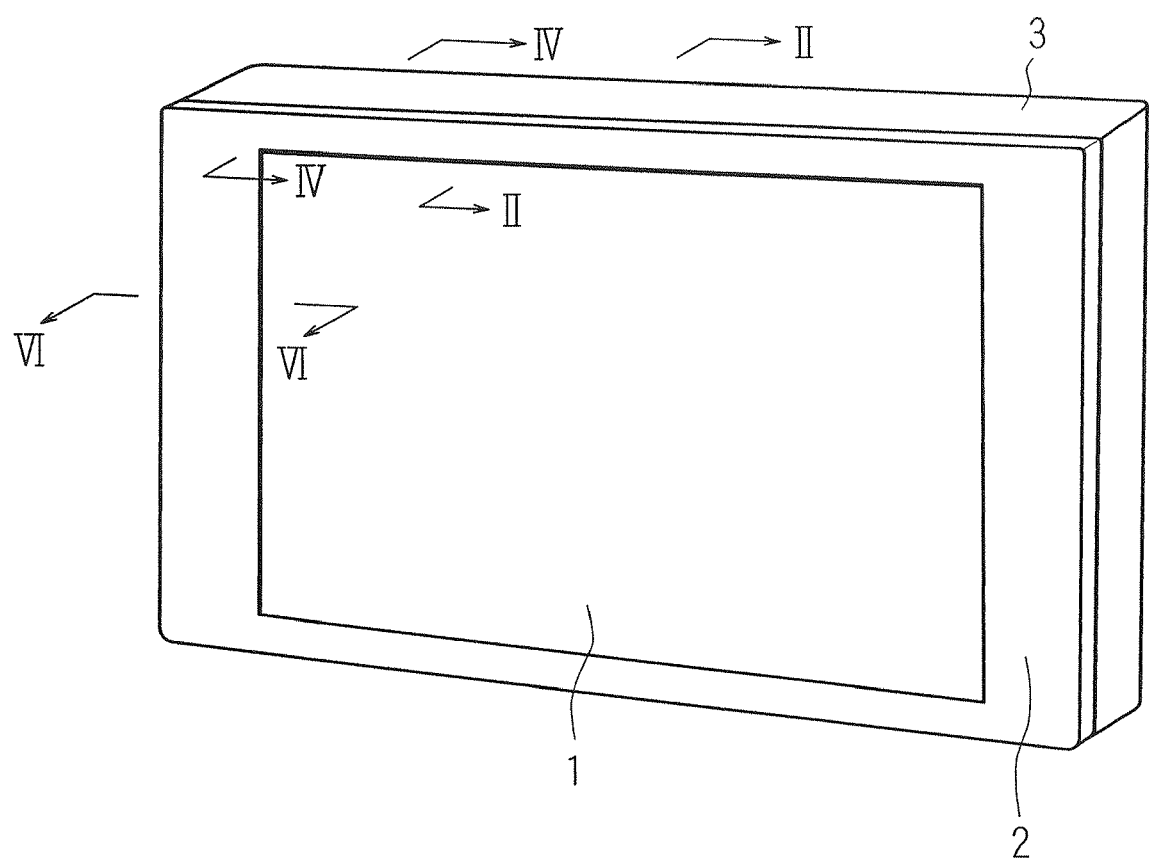
FIG. 1 is a schematic external view showing a liquid crystal display device according to a first embodiment.
Figure 2:
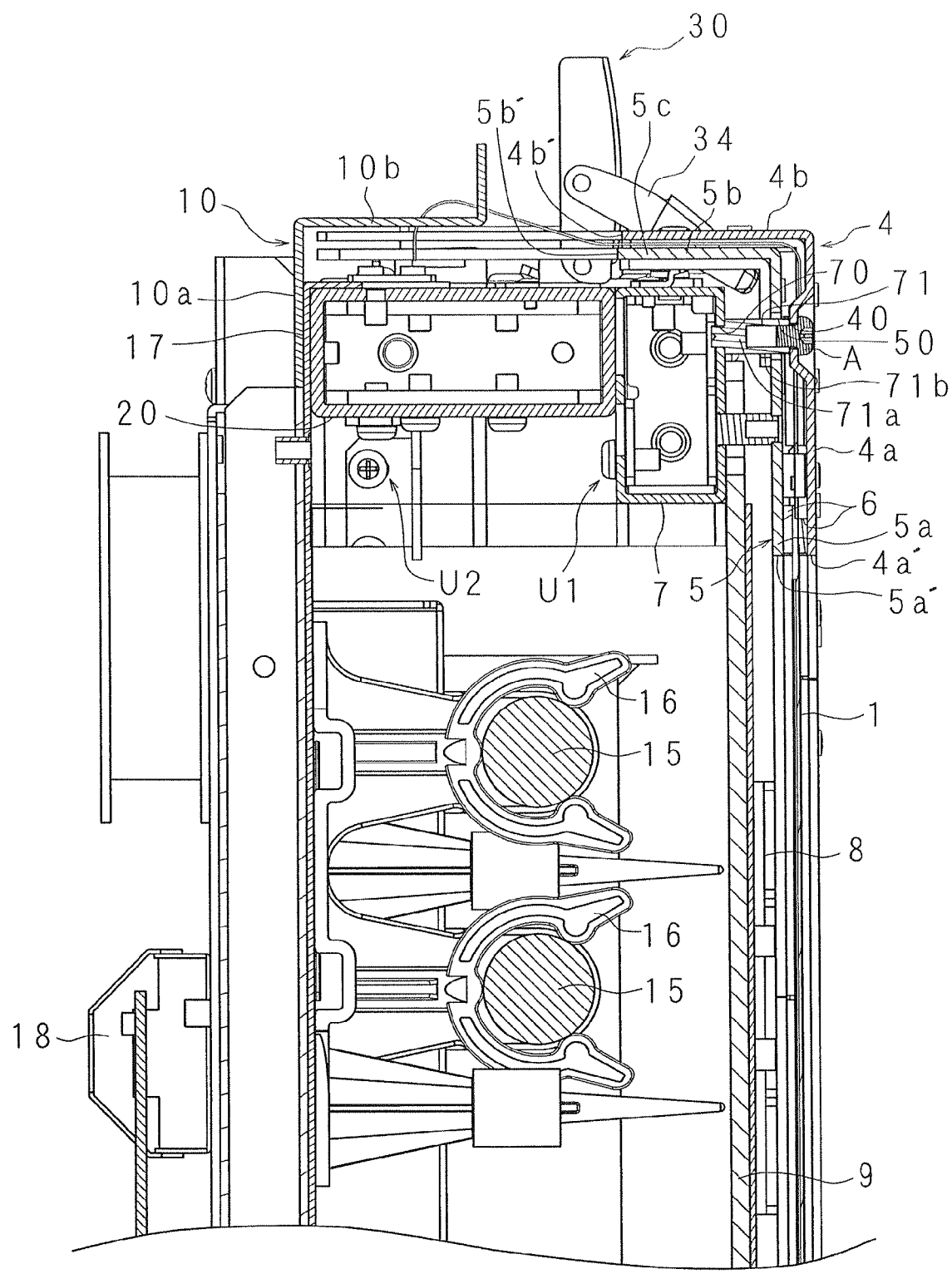
FIG. 2 is a schematic vertical cross-sectional view taken along line II-II shown in FIG. 1.
Figure 3:
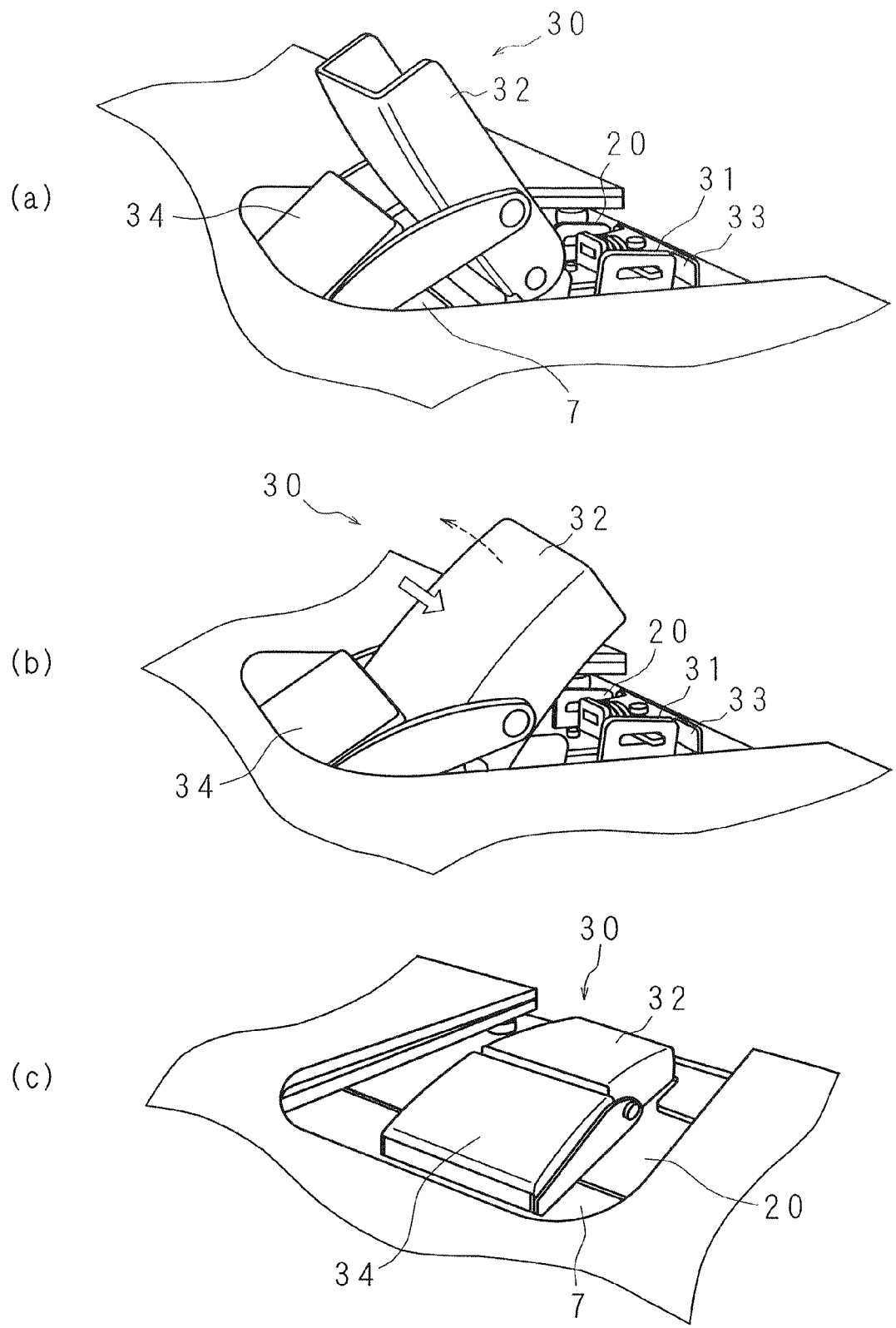
FIGS. 3A to 3C are explanatory views for explaining the operation of a clamper in the liquid crystal display device according to the first embodiment.
Figure 4:
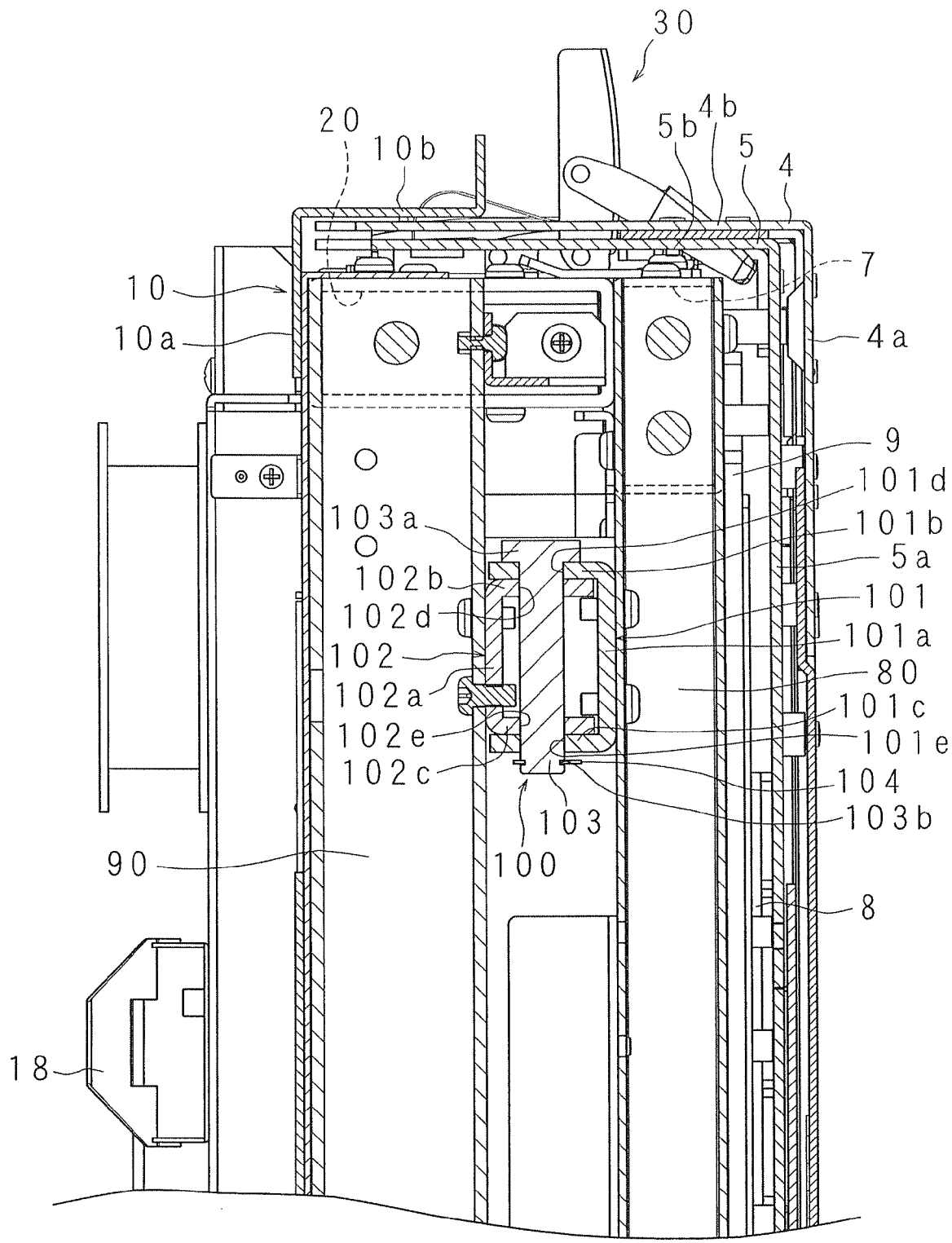
FIG. 4 is a schematic vertical cross-sectional view taken along line IV-IV shown in FIG. 1.
Figure 5:
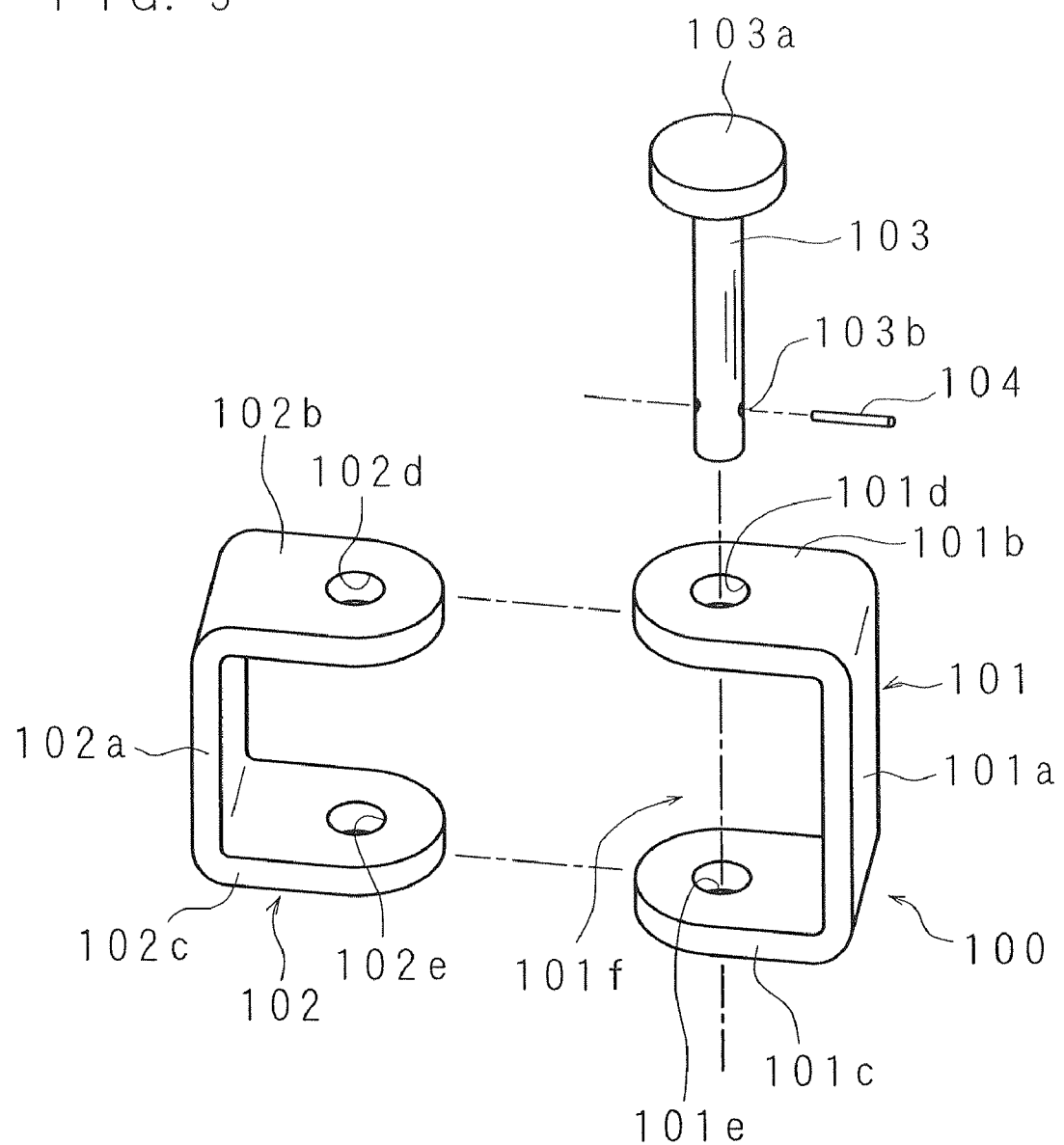
FIG. 5 is a schematic exploded perspective view showing a pivotal member in the liquid crystal display device according to the first embodiment.
Figure 6:
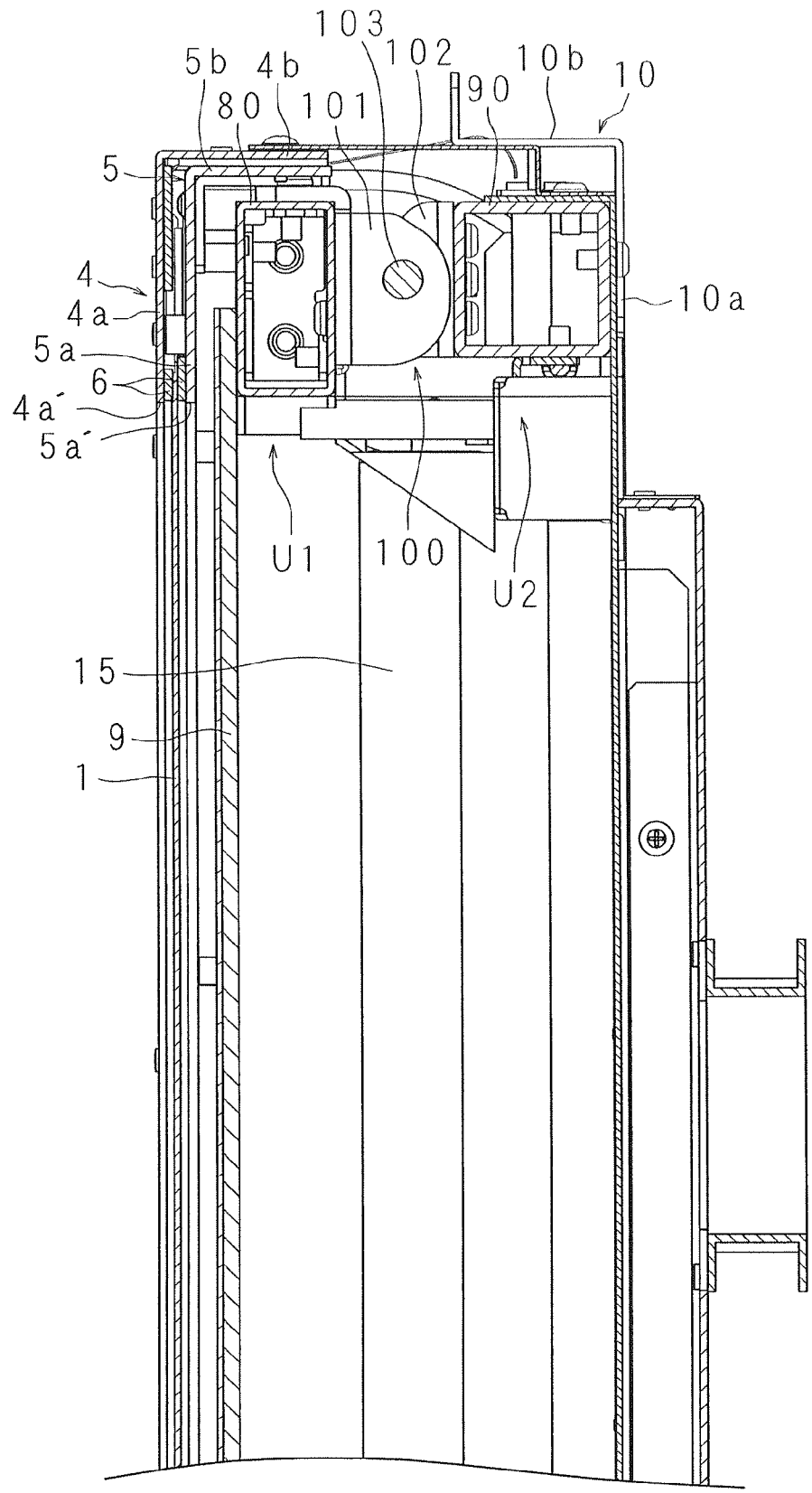
FIG. 6 is a schematic horizontal cross-sectional view taken along line VI-VI shown in FIG. 1.
Figure 7:
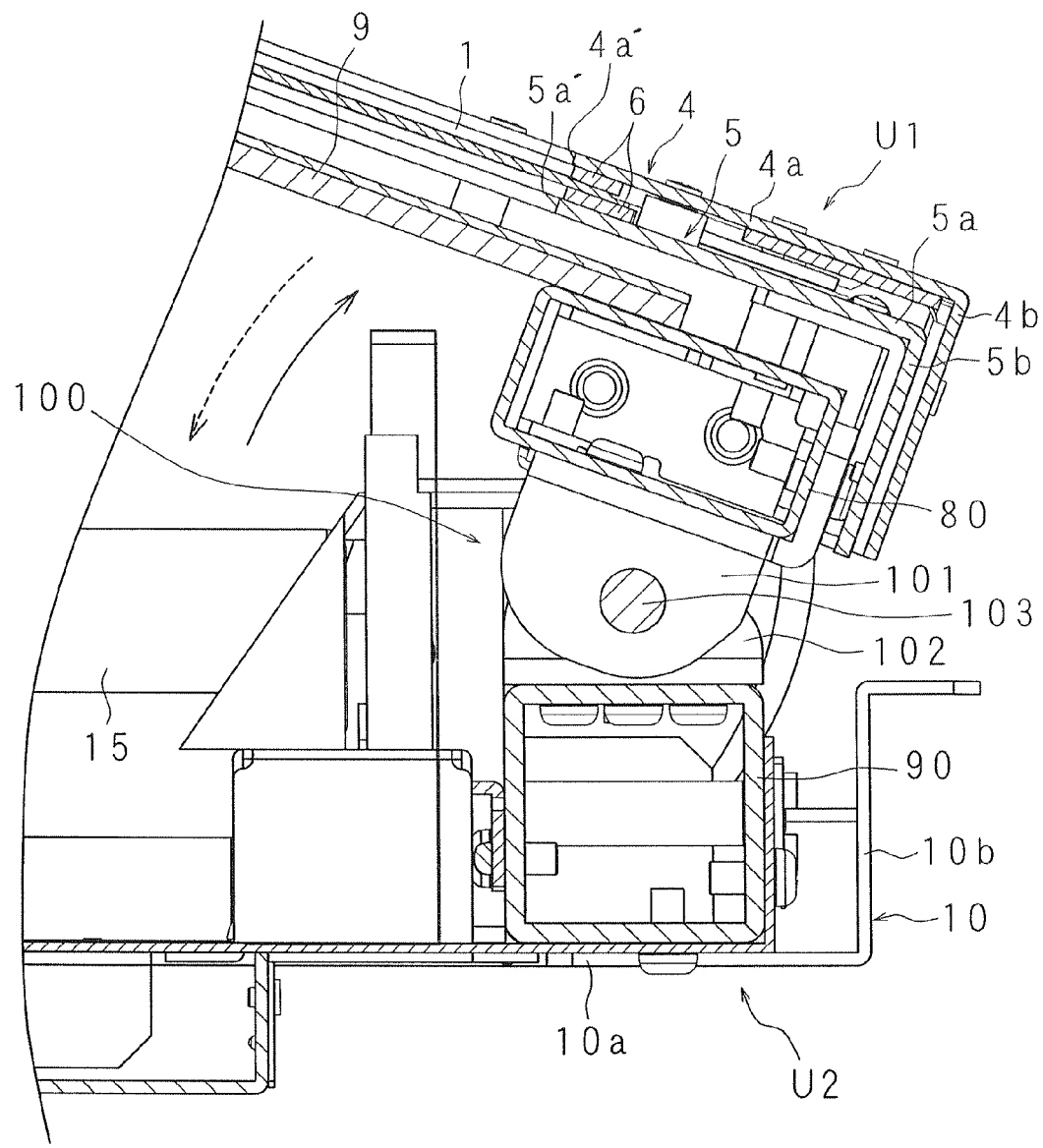
FIG. 7 is an explanatory view for explaining the pivoting of the pivotal member in the liquid crystal display device according to the first embodiment.
Figure 8:
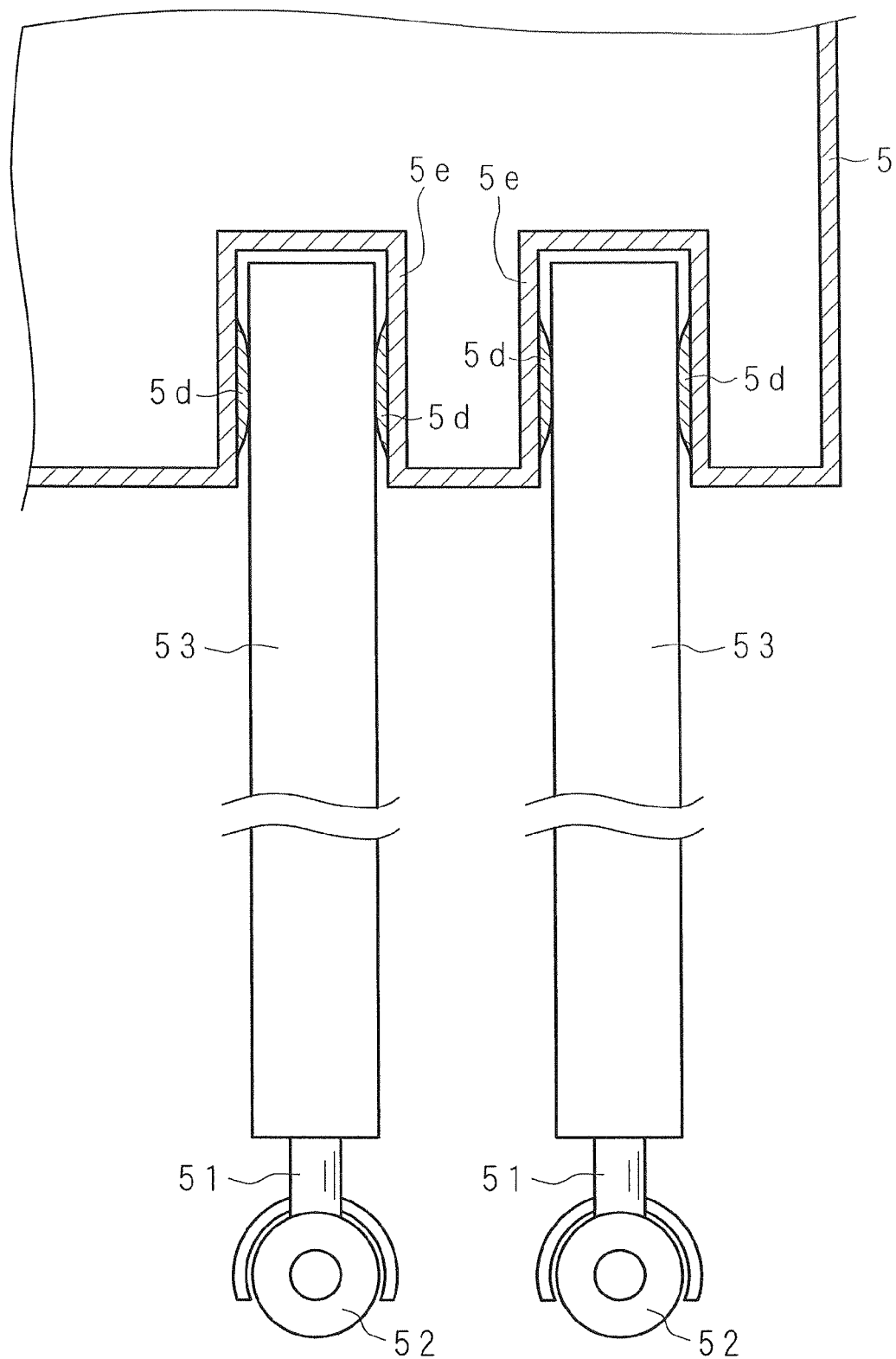
FIG. 8 is a schematic partial cross-sectional view showing attachment/detachment portions in the liquid crystal display device according to the first embodiment.
Figure 9:
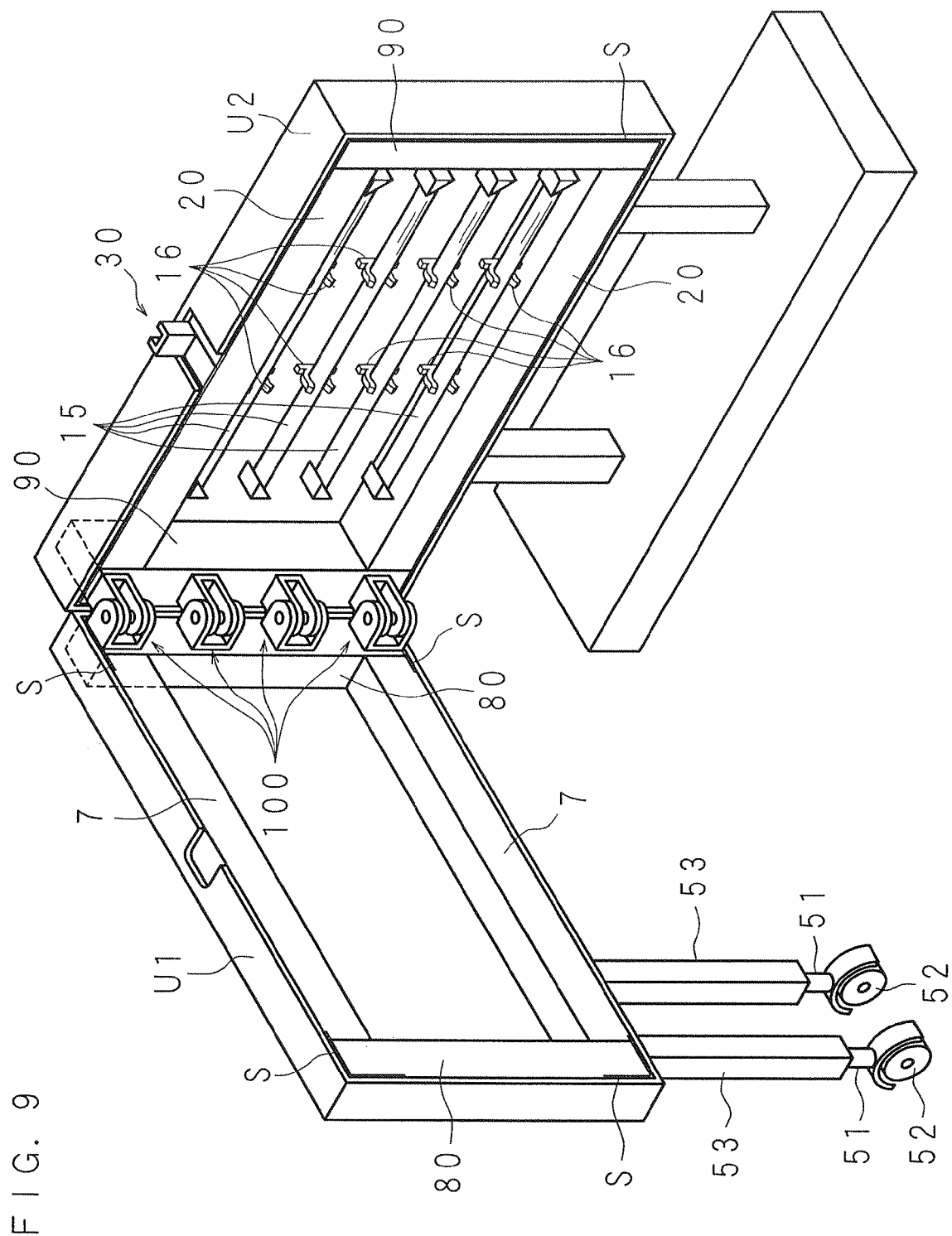
FIG. 9 is a schematic view showing a condition where a fluorescent tube supported by a lamp clip is exposed in the liquid crystal display device according to the first embodiment.

Hereinafter, the present invention will be described in detail based on the drawings of a liquid crystal display device according to a first embodiment. FIG. 1 is a schematic external view showing the liquid crystal display device. FIG. 2 is a schematic vertical cross-sectional view taken along line II-II shown in FIG. 1. FIGS. 3A to 3C are explanatory views for explaining the operation of a damper. FIG. 4 is a schematic vertical cross-sectional view taken along line IV-IV shown in FIG. 1. FIG. 5 is a schematic exploded perspective view showing a pivotal member. FIG. 6 is a schematic horizontal cross-sectional view taken along line VI-VI shown in FIG. 1. FIG. 7 is an explanatory view for explaining the pivoting of the pivotal member. FIG. 8 is a schematic partial cross-sectional view showing attachment/detachment portions. FIG. 9 is a schematic view showing a condition where a fluorescent tube supported by a lamp clip is exposed.

In the figures, reference numeral 1 represents a rectangular display panel that displays images by means of liquid crystal. A front cabinet 2 as an exterior is provided on the front side of the display panel 1, and a rear cabinet 3 as an exterior is provided on the back side thereof. A bezel 4 is provided on the periphery on the front side of the display panel 1 inside the cabinets. The bezel 4 is provided with: a rectangular annular plate portion 4a where a rectangular opening 4a' in which the display panel 1 is disposed is formed in the center thereof; and an angular tube portion 4b extending backward from the outer edge of the annular plate portion 4a. A frame 5 supporting the display panel 1 is provided on the back side of the display panel 1. The frame 5 is provided with: a rectangular annular plate portion 5a where a rectangular opening 5a' in which the display panel 1 is disposed is formed in the center thereof; and an angular tube portion 5b extending backward from the outer edge of the annular plate portion 5a. The annular plate portion 5a is opposed to the back side of the annular plate portion 4a. The angular tube portion 5b is situated inside the angular tube portion 4b. The bezel 4, the display panel 1 and the frame 5 are coupled by a non-illustrated coupling member.

The display panel 1 is disposed in a position corresponding to the rectangular opening 4a' and the rectangular opening 5a' between the annular plate portion 4a and the annular plate portion 5a. A plurality of elastic support members 6 supporting the display panel 1 are provided between the annular plate portion 4a and the display panel 1 and between the annular plate portion 5a and the display panel 1, respectively. A through hole 40 is formed in the annular plate portion 4a, and a through hole 50 corresponding to the through hole 40 is formed in the annular plate portion 5a.

An elongated angular-tube-form sheet side reinforcing member 7 is provided in the vicinity of the through hole 50 on the back side of the annular plate portion 5a. The sheet side reinforcing member 7 is disposed along the inside of an upper side surface 5c of the angular tube portion 5b. A plurality of sheet support plates 8 supporting an optical sheet 9 described later are provided on the front side of the sheet side reinforcing member 7. The sheet support plates 8 are situated in the vicinity of the back surface of the annular plate portion 5a. The rectangular optical sheet 9 that diffuses the light of a fluorescent tube 15 described later and irradiates the display panel 1 with the light is attached between the sheet support plates 8 and the sheet side reinforcing member 7. The sheet side reinforcing member 7 is also provided on the lower surface of the angular tube portion 5b opposed to an upper surface 5c (see FIG. 9). Moreover, as shown in FIGS. 4 and 9, two elongated angular-tube-form first reinforcing members 80 that are perpendicular to the upper surface 5c are provided inside the angular tube portion 5b. The first reinforcing members 80 are disposed along the right and left sides of the optical sheet 9, respectively.

A through hole 70 corresponding to the through holes 40 and 50 is formed on the front side of the sheet side reinforcing member 7. A cylindrical coupling pin 71 having a bottom and coupling the sheet side reinforcing member 7 and the annular plate portion 5a is inserted in the through holes 50 and 70. A bottom portion 71a of the coupling pin 71 is situated in the through hole 70, and a cylindrical portion 71b of the coupling pin 71 is situated in the through hole 50. The cylindrical portion 71b is a female screw, and the opening of the cylindrical portion 71b is situated in the vicinity of the through hole 40. A male screw A is inserted into the through hole 40 from the front side so as to be engaged with the cylindrical portion 71b. The engagement of the male screw A secures the bezel 4, the display panel 1 and the frame 5 to the sheet side reinforcing members 7. The sheet side reinforcing members 7 and the first reinforcing members 80 are coupled by a non-illustrated coupling member. Hereinafter, the bezel 4, the display panel 1, the frame 5, the optical sheet 9, the sheet side reinforcing members 7 and the first reinforcing members 80 will be referred to as a unit U1.

A backlight chassis 10 supporting a plurality of fluorescent tubes 15 is provided on the back side of the sheet reinforcing members 7. The backlight chassis 10 is provided with a rectangular back plate portion 10a, and a plurality of lamp clips 16 holding the fluorescent tube 15 are provided on the front side of the back plate portion 10a. Moreover, the backlight chassis 10 is provided with an angular-tube-form side portion 10b extending forward from the periphery of the back plate portion 10a. The side portion 10b is provided outside the angular tube portion 4b so as to surround it.

Two elongated angular-tube-form chassis side reinforcing members 20 are provided inside the angular tube portion 5b so as to adjoin the sheet side reinforcing members 7 and the back plate portion 10a. The chassis side reinforcing members 20 are disposed along the lower surfaces (not shown) opposed to the upper surface 5c and the upper surface 5c, respectively (see FIG. 9). The chassis side reinforcing members 20 are fixed to the back plate portion 10a through a fixing plate 17 provided on the front side of the back plate portion 10a.

Two elongated angular-tube-form second reinforcing members 90 are provided so as to be separated backward from the first reinforcing members 80. The second reinforcing members 90 are opposed to the first reinforcing members 80, and are disposed along the right and left sides of the back plate portion 10a, respectively. Hereinafter, the backlight chassis 10, the chassis side reinforcing members 20 and the second reinforcing members 90 coupled through the fixing plate 17 will be referred to as a unit U2.

The chassis side reinforcing members 20 and the first reinforcing members 80 are coupled by a non-illustrated coupling member. An inverter 18 that converts direct current to alternating current is provided on the back plate portion 10a. The inverter 18 supplies power to the fluorescent tube 15.

An opening 5b' is formed in the center of the upper surface 5c, and an opening 4b' corresponding to the opening 5b' is formed in the angular tube portion 4b. A damper 30 that fixes the unit U1 and the unit U2 is provided in the openings 4b' and 5b'. As shown in FIG. 3A, the damper 30 is provided with a spring portion 31 disposed on the opening 5b' side of the chassis side reinforcing member 20 disposed on the upper side. The damper 30 is also provided with a lever portion 32 disposed on the opening 5b' side of the chassis side reinforcing member 20 disposed on the upper side and on the front side of the spring portion 31 and a stopper 33 disposed on the back side of the spring portion 31. The damper 30 functions as a restricting member that restricts the pivoting of the display panel 1.

The lever portion 32 is provided so as to be rotatable in the front-back direction, and is coupled to the spring portion 31. When a backward force is applied to the lever portion 32, the lever portion 32 is rotated against the energizing force of the spring portion 31, so that a stopper receiver (not shown) provided on the lever portion 32 is engaged with the stopper 33. When the lever portion 32 is disengaged from the stopper 33, the lever portion 32 is rotated forward by the energizing force of the spring portion 31. The damper 30 has a protrusion (not shown) provided on the opening 5b' side of the sheet side reinforcing member 7 disposed on the upper side. The damper 30 is pivotally attached to the lever portion 32, and has an engagement portion 34 that engages with the protrusion.

Next, the operation of the clamper 30 will be described. When the unit U1 and the unit U2 are fixed by the damper 30, the engagement portion 34 is engaged with the protrusion (see FIG. 3A), a backward force is applied to the lever portion 32 as shown by the hollow arrow in FIG. 3B, and the lever portion 32 is rotated backward against the energizing force of the spring portion 31. Then, the lever portion 32 is engaged with the stopper 33 (see FIG. 3C).

When the unit U1 and the unit U2 are unfixed, as shown by the broken arrow in FIG. 3B, a forward force is applied to the lever portion 32, and the lever portion 32 is disengaged from the stopper 33. Then, the lever portion 32 is rotated forward by the energizing force of the spring portion 31 (see FIG. 3A). At this time, the engagement portion 34 is rotated, so that the engagement portion 34 is disengaged from the protrusion and the unit U1 and the unit U2 are unfixed.

As shown in FIG. 9, a plurality of pivotal members 100 are juxtaposed between the first reinforcing member 80 disposed on the left side and the second reinforcing member 90 disposed on the left side. As shown in FIGS. 4 and 5, the pivotal member 100 is provided with a first fixed portion 101 fixed to the first reinforcing member 80 and a second fixed portion 102 fixed to the second reinforcing member 90. The pivotal member 100 is also provided with a shaft member 103 that couples the first fixed portion 101 and the second fixed portion 102.

As shown in FIGS. 4 and 5, the first fixed portion 101 is provided with a rectangular first fixed plate portion 101a fixed to the back side of the first reinforcing member 80 disposed on the left side. The long side of the first fixed plate portion 101a is parallel to the direction of the shaft center of the first reinforcing member 80. The first fixed portion 101 has two first extending plate portions 101b and 101c extending backward from the short sides of the first fixed plate portion 101a, respectively. A through hole 101d is formed in the first extending plate portion 101b, and a through hole 101e corresponding to the through hole 101d is formed in the first extending plate portion 101c. The first fixed plate portion 101a and the first extending plate portions 101b and 101c form a concave portion 101f.

The second fixed portion 102 is provided with a rectangular second fixed plate portion 102a fixed to the front side of the second reinforcing member 90 disposed on the left side. The long side of the second fixed plate portion 102a is parallel to the direction of the length of the second reinforcing member 90. The second fixed portion 102 is provided with two second extending plate portions 102b and 102c extending frontward from the short sides of the second fixed plate portion 102a, respectively. A through hole 102d is formed in the second extending plate portion 102b, and a through hole 102e corresponding to the through hole 102d is formed in the second extending plate portion 102c. The distance from the second extending plate portion 102b to the second extending plate portion 102c is shorter than the distance from the first extending plate portion 101b to the first extending plate portion 101c.

The second extending plate portions 102b and 102c of the second fixed portion 102 are disposed in the concave portion 101f, and the positions of the through holes 102d and 102e are aligned with the positions of the through holes 101d and 101e. The shaft member 103 is inserted in the through holes 101d, 101e, 102d and 102e. A disk-form head portion 103a is provided on one end of the inserted shaft member 103. The shaft member 103 is engaged with the first fixed portion 101 by the head portion 103a. On the other end of the shaft member 103, a hole 103b perpendicular to the shaft center is formed so as to pass through, and a pin 104 that prevents the shaft member 103 from coming off is inserted in the hole 103b.

When the unit U1 and the unit U2 are uncoupled and a forward force is applied to the unit U1, as shown by the solid arrow in FIG. 7, the first fixed portion 101 is pivoted through the shaft member 103, so that the unit U1 is separated from the unit U2. Moreover, when a backward force is applied to the unit U1, as shown by the broken arrow in FIG. 7, the unit U1 approaches the unit U2.

As shown in FIG. 8, two concave portions are provided on the right side on the lower surface opposed to the upper surface 5c (see FIG. 2). The concave portions serve as attachment/detachment portions 5e for attaching and detaching bar-form leg portions 53 described later. The attachment/detachment portions 5e have a plurality of elastic members 5d sandwiching the leg portions 53.

When the unit U1 and the unit U2 are uncoupled, one end of the leg portion 53 supporting the unit U1 is fitted in the attachment/detachment portion 5e. An axis 51 that rotates around the axis of the leg portion 53 is provided on the other end of the leg portion 53, and a caster 52 is provided on the axis 51.

Next, the replacement of the fluorescent tube will be described.

When the fluorescent tube 15 is replaced, first, the front cabinet 2 and the rear cabinet 3 are detached. Then, the leg portion 53 is fitted into the attachment/detachment portion 5e. Then, the lever portion 32 is rotated forward to uncouple the unit U1 and the unit U2. Then, the unit U1 is pivoted forward with respect to the pivotal member 100. At this time, the unit U1 is smoothly pivoted by the caster 52 (see FIG. 9). The unit U1 is separated from the unit U2 by the pivoting, so that the fluorescent tube 15 held by the lamp clip 16 is exposed. The exposed fluorescent tube 15 is replaced with another fluorescent tube 15, and when the replacement is finished, the unit U1 is pivoted backward. Then, the unit U1 and the unit U2 are fixed by the damper 30, and the leg portion 53 is detached from the attachment/detachment portion 5e.

An elastic member S for preventing the entry of dust is provided in an appropriate position in the vicinity of the backlight chassis 10 and the frame 5. For example, the elastic member S is provided on the outer surfaces of the chassis side reinforcing members 20 and the second reinforcing members 90 and the part of coupling between the first reinforcing members 80 and the sheet side reinforcing members 7.

In the liquid crystal display device according to the first embodiment, the optical sheet 9 that diffuses light is disposed on the front side of the backlight chassis 10 supporting the fluorescent tube 15, the frame 5 supporting the display panel 1 for displaying images is provided on the front side of the optical sheet 9, the bezel 4 is provided on the front side of the frame 5, the bezel 4, the display panel 1, the frame 5 and the optical sheet 9 are coupled, the bezel 4, the display panel 1, the frame 5 and the optical sheet 9 constitute the unit U1, the first reinforcing member 80 is provided along one side of the optical sheet 9, the second reinforcing member 90 opposed to the first reinforcing member 80 is provided along one side of the backlight chassis 10, and the pivotal member 100 is provided between the first reinforcing member 80 and the second reinforcing member 90. Thereby, when the fluorescent tube 15 is replaced, the unit U1 is pivoted through the pivotal member 100 to be separated from the backlight chassis 10, the fluorescent tube 15 is replaced, and when the replacement of the fluorescent tube 15 is finished, the unit U1 is brought close to the backlight chassis 10, whereby the fluorescent tube 15 can be replaced by a small number of persons in a short time without the unit U1 being detached. In addition, the backlight chassis 10 can be prevented from being deformed by loading the first reinforcing member 80 and the second reinforcing member 90 with the weight of the unit U1 when the unit U1 is driven.

Moreover, the first fixed portion 101 fixed to the first reinforcing member 80 and the second fixed portion 102 fixed to the second reinforcing member 90 are provided, the concave portion 101f is provided on the second reinforcing member 90 side of the first fixed portion 101, the second fixed portion 102 is disposed in the concave portion 101f, the first fixed portion 101 and the second fixed portion 102 are inserted in a plurality of through holes being formed, and the pivotal member 100 is provided that has the shaft member 103 coupling the first fixed portion 101 and the second fixed portion 102 so as to be pivotable. Thereby, when the fluorescent tube 15 is replaced, the unit U1 is pivoted through the pivotal member 100 to be separated from the backlight chassis 10, the fluorescent tube 15 is replaced, and when the replacement of the fluorescent tube 15 is finished, the unit U1 is brought close to the backlight chassis 10, whereby the fluorescent tube 15 can be replaced by a small number of persons in a short time without the unit U1 being detached. In addition, the backlight chassis 10 can be prevented from being deformed by loading the second reinforcing member 90 with the weight of the unit U1 when the unit U1 is driven.

Moreover, the first fixed plate portion 101a is fixed to the first reinforcing member 80, the two first extending plate portions 101b and 101c extending from the first fixed plate portion 101a toward the second reinforcing member 90 vertically to the direction of the shaft center of the first reinforcing member 80 are provided, the through holes 101d and 101e are formed in the first extending plate portions 101b and 101c, the second fixed plate portion 102a is fixed to the second reinforcing member 90, the two second extending plate portions 102b and 102c extending from the second fixed plate portion 102a toward the first reinforcing member 80 vertically to the direction of the shaft center of the second reinforcing member 90 are provided, the through holes 102d and 102e are formed in the second extending plate portions 102b and 102c, and the shaft member 103 is inserted in the through holes 101d, 101e, 102d and 102e to thereby couple the first extending plate portions 101b and 101c and the second extending plate portions 102b and 102c. Thereby, when the fluorescent tube 15 is replaced, the unit U1 is pivoted through the pivotal member 100 to be separated from the backlight chassis 10, and when the replacement of the fluorescent tube 15 is finished, the unit U1 is brought close to the backlight chassis 10, whereby the fluorescent tube 15 can be replaced by a small number of persons in a short time without the unit U1 being detached. In addition, the backlight chassis 10 can be prevented from being deformed by loading the second reinforcing member 90 with the weight of the unit U1 when the unit U1 is driven.

Moreover, by providing the frame 5 with the attachment/detachment portion 5e for attaching and detaching the leg portion 53 supporting the unit U1, when the fluorescent tube 15 is replaced, the leg portion 53 is attached to the attachment/detachment portion 5e, the pivotal member 100 is pivoted, the unit U1 separated from the backlight chassis 10 is supported by the leg portion 53, and when the replacement of the fluorescent tube 15 is finished and the unit U1 is fixed to the unit U2, the leg portion 53 is detached. Thereby, when the fluorescent tube 15 is replaced, the backlight chassis 10 can be prevented from being deformed by the weight of the unit U1. In addition, the fluorescent tube 15 can be replaced by a small number of persons by reducing the number of hands for supporting the unit U1.

Moreover, by providing the caster 52 on an end of the leg portion 53, the unit T1 is smoothly brought into contact with and separated from the backlight chassis 10, so that the fluorescent tube 15 can be replaced in a short time.

Moreover, since the first reinforcing member 80 and the second reinforcing member 90 have a tube form, the first reinforcing member 80 and the second reinforcing member 90 have a strength sufficient for supporting the unit U1, so that the backlight chassis 10 can be surely prevented from being deformed by the weight of the unit U1.

A structure may be adopted in which the distance from the second extending plate portion 102b to the second extending plate portion 102c is longer than the distance from the first extending plate portion 101b to the first extending plate portion 101c and the first fixed portion 101 is disposed in a concave portion formed by the second fixed plate portion 102a and the second extending plate portions 102b and 102c. Moreover, a structure may be adopted in which the first extending plate portions 101b and 101c and the second extending plate portions 102b and 102c are disposed so as to alternate with each other and coupled by the shaft member 103. Moreover, the shape of the reinforcing members is not limited to a tube form but may be a rod form having an L-shaped or T-shaped cross section.

A stopper member that stops the rolling of the caster 52 may be provided on the caster 52. A rubber member may be attached to the leg portion 53 instead of the caster 52, and the lens portion 53 may be extendable. A member that sandwiches the leg portion 53 may be attached to the bezel 4 as the attachment/detachment portion.

A plurality of LED panels having a plurality of white LEDs or the like may be provided instead of the plurality of fluorescent tubes 15. In this case, a defective LED panel can be replaced by disengaging the damper 30.

The pivotal member 100 may be provided in a display device other than a liquid crystal display device. For example, in the case of a plasma display, a plasma display panel and a chassis supporting the plasma display panel may be coupled by the pivotal member 100. In this case, the damper 30 is disengaged to separate the plasma display panel and the chassis, whereby cleaning of the plasma display panel and the replacement of a circuit board attached to the chassis can be performed without the plasma display panel being detached. Moreover, a structure may be adopted in which an optical filter disposed in front of the plasma display panel and displaying images by transmitting light emitted by the plasma display panel is supported by a unit including the plasma display panel and the chassis, and the optical filter and the unit are coupled by the pivotal member 100. In this case, the optical filter and the plasma display panel are separated, whereby cleaning of the plasma display panel and the replacement of the optical filter can be performed without the optical filter and the plasma display panel being detached.

Figure 10:
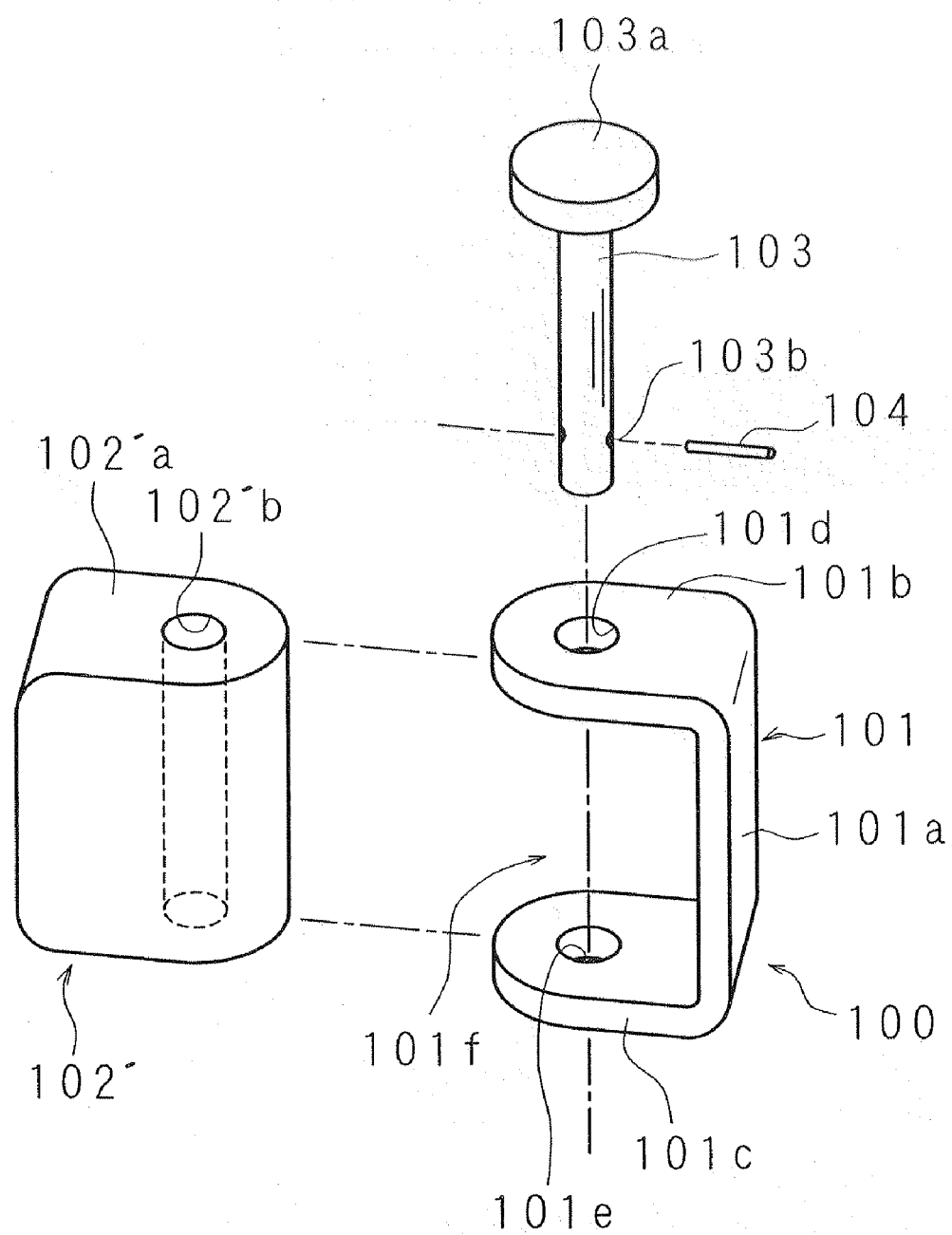
FIG. 10 is a schematic exploded perspective view showing a pivotal member used in a modification of the liquid crystal display device according to the first embodiment.

Next, a modification of the liquid crystal display device according to the first embodiment will be described. FIG. 10 is a schematic exploded perspective view showing a pivotal member used in the modification of the liquid crystal display device according to the first embodiment. The pivotal member 100 has a second fixed portion 102' fixed to the second reinforcing member 90. The second fixed portion 102' is provided with a block-form body portion 102'a and a through hole 102'b provided in the body portion 102'a and corresponding to the through hole 101d and the through hole 101e. The shaft member 103 is inserted in the through hole 101d, the through hole 101e and the through hole 102'b so that the unit U1 and the unit U2 are pivoted.

(Second Embodiment)

Figure 11:
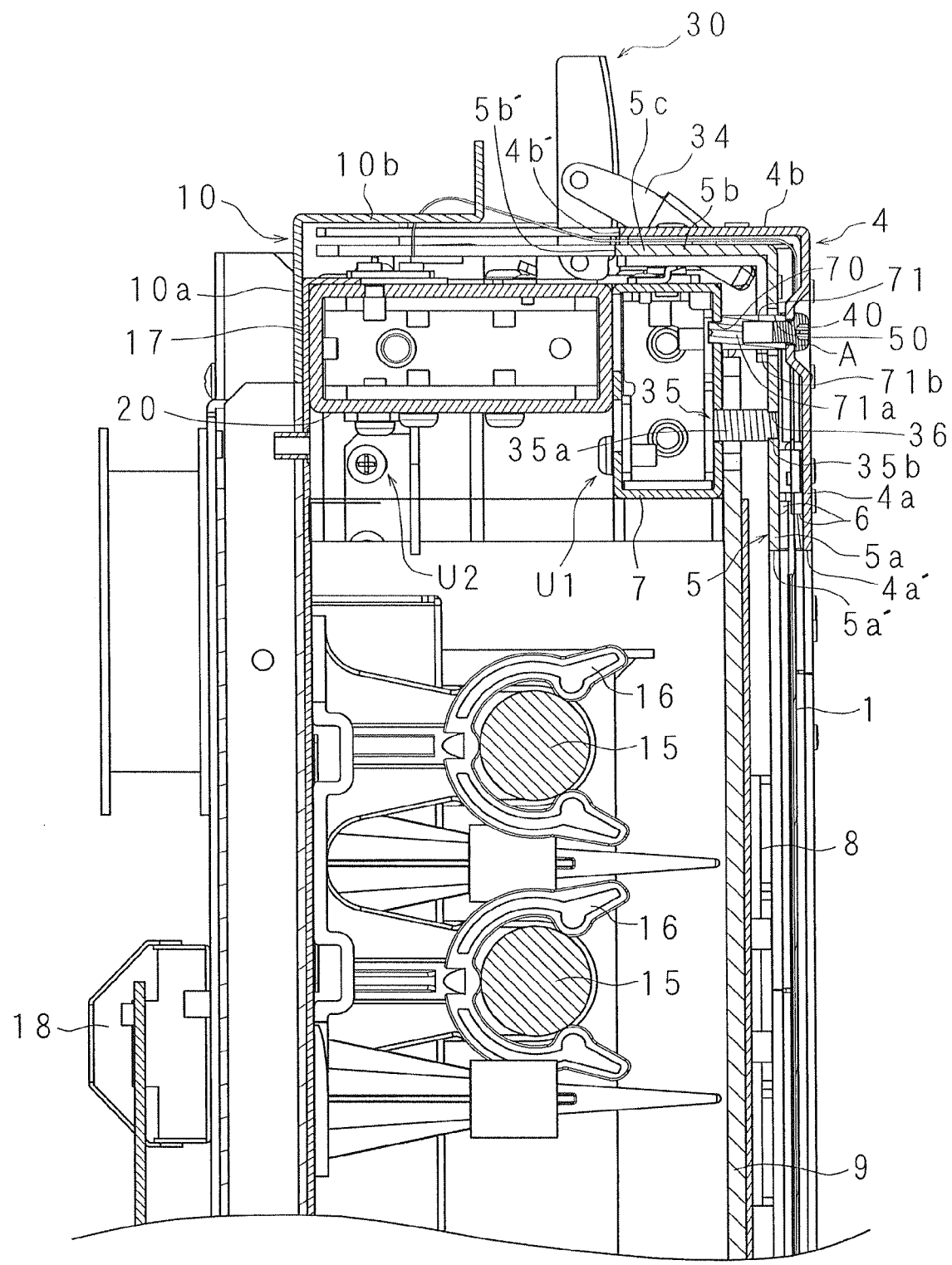
FIG. 11 is a schematic vertical cross-sectional view of a display device from which the frame is detached in a liquid crystal display device according to a second embodiment.
Figure 12:
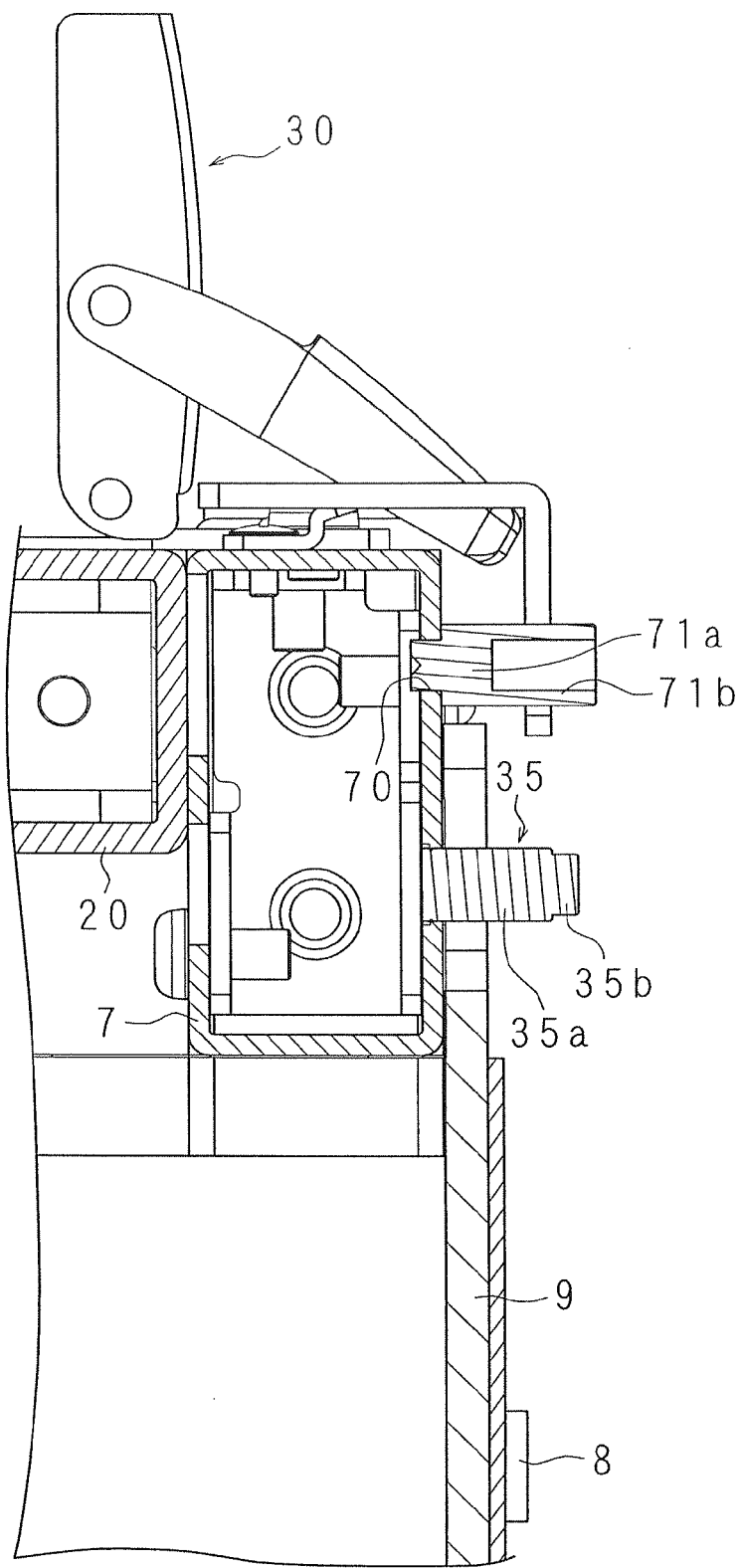
FIG. 12 is a schematic vertical cross-sectional view of a display device from which the frame is detached in the liquid crystal display device according to the second embodiment.
Figure 13:
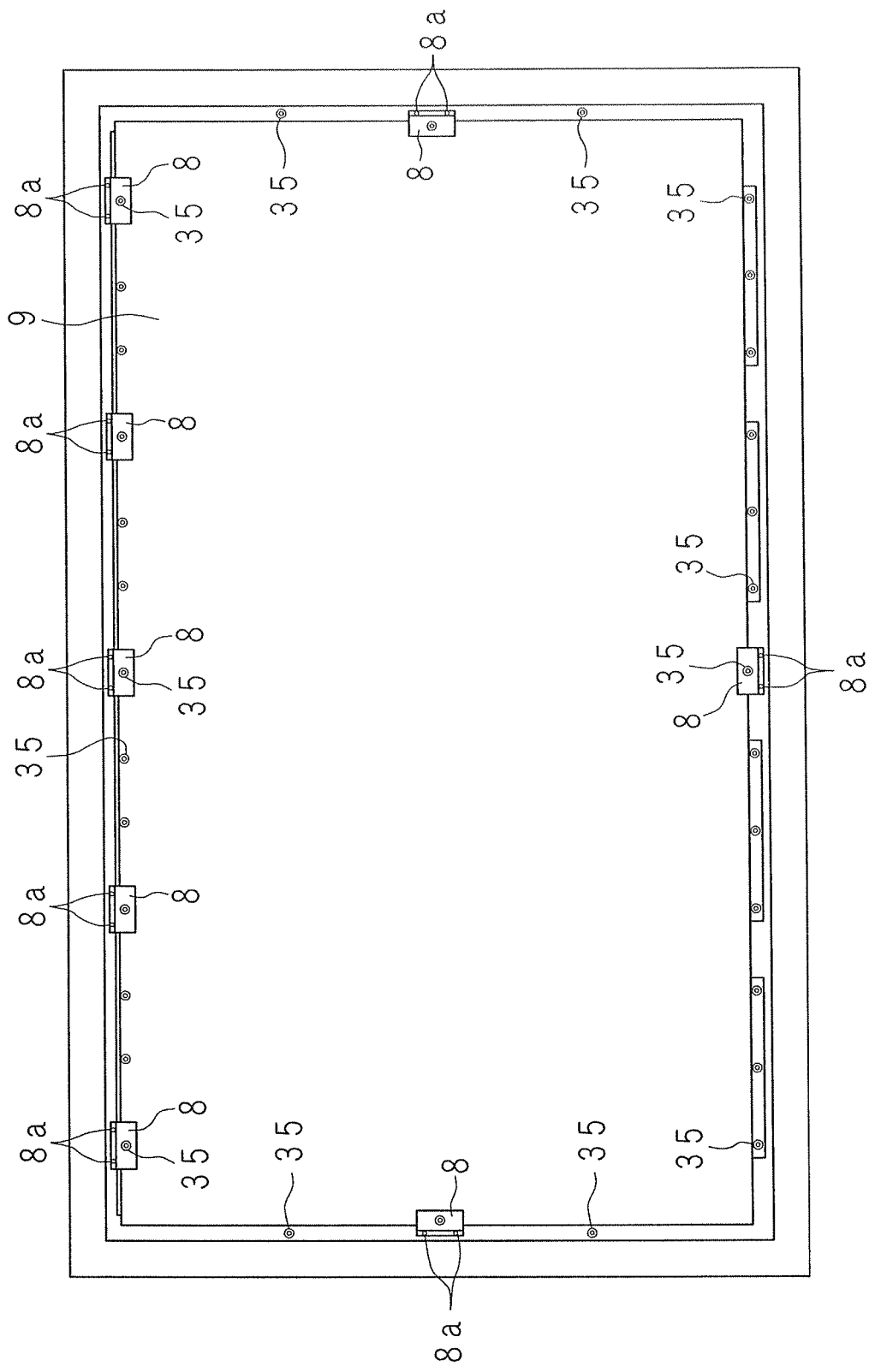
FIG. 13 is a schematic front view of the liquid crystal display device according to the second embodiment in a condition where the frame is detached.
Figure 14:
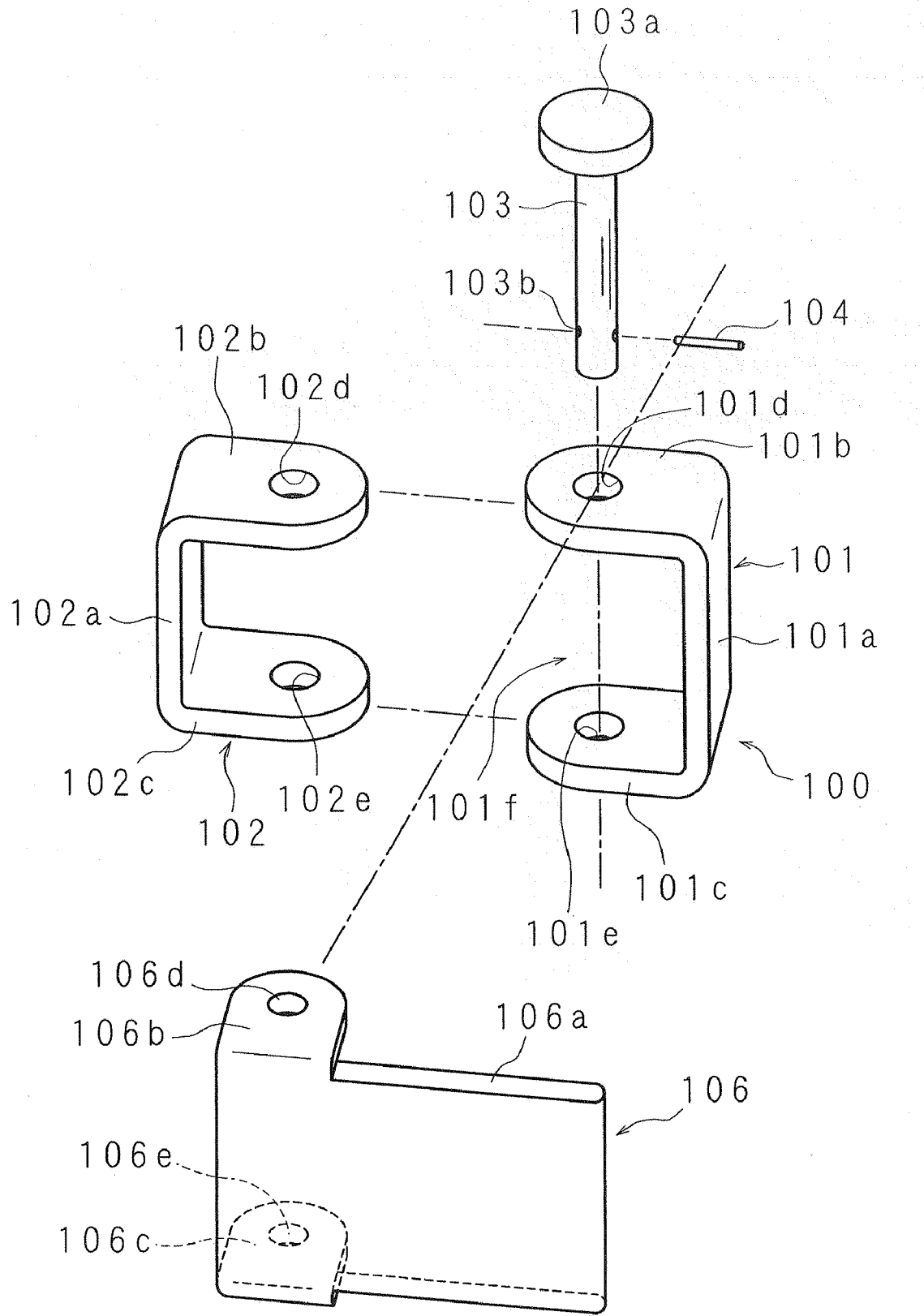
FIG. 14 is a schematic exploded perspective view showing a pivotal member in the liquid crystal display device according to the second embodiment.
Figure 15:
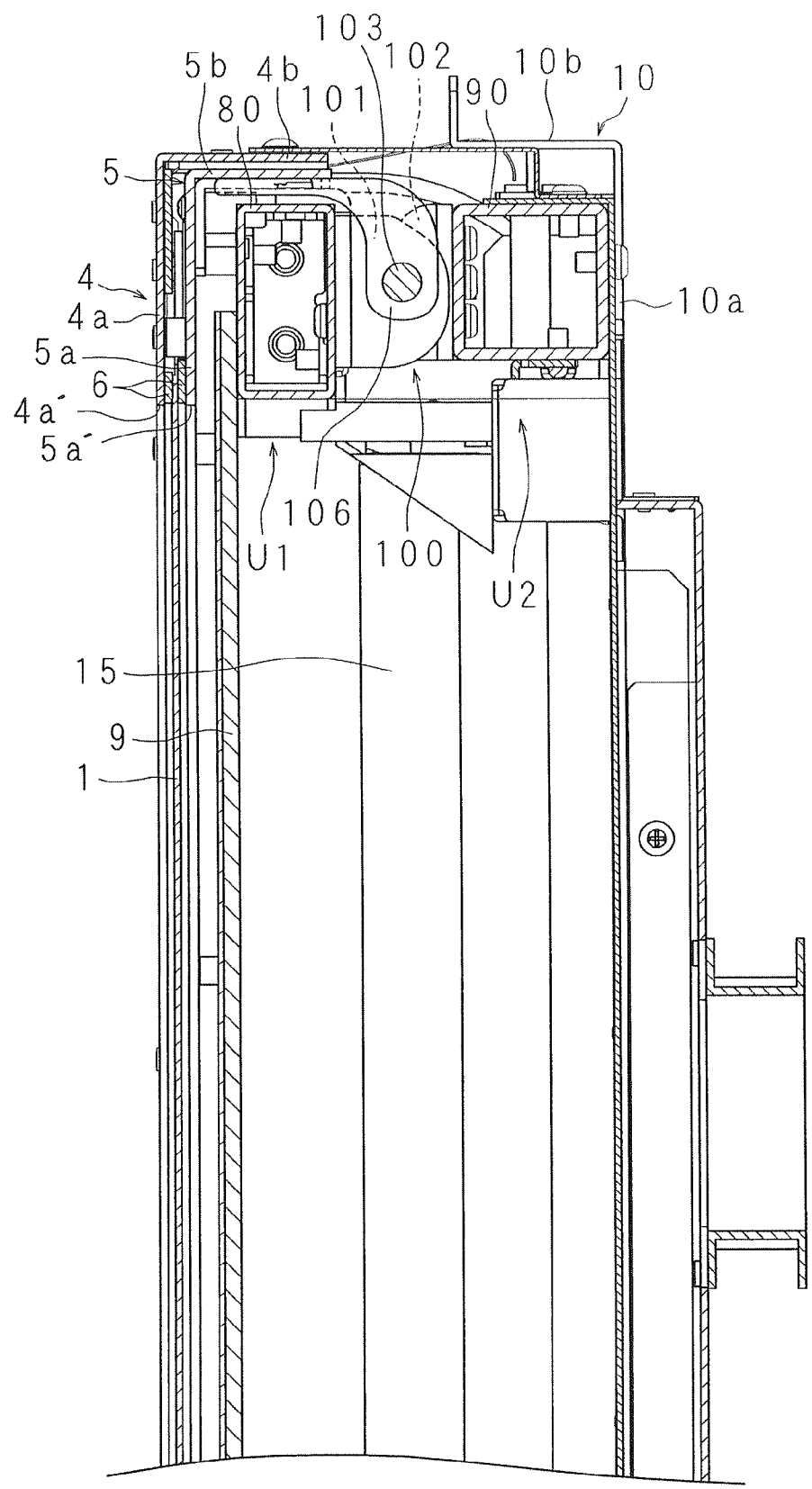
FIG. 15 is a schematic horizontal cross-sectional view of the liquid crystal display device according to the second embodiment.
Figure 16:
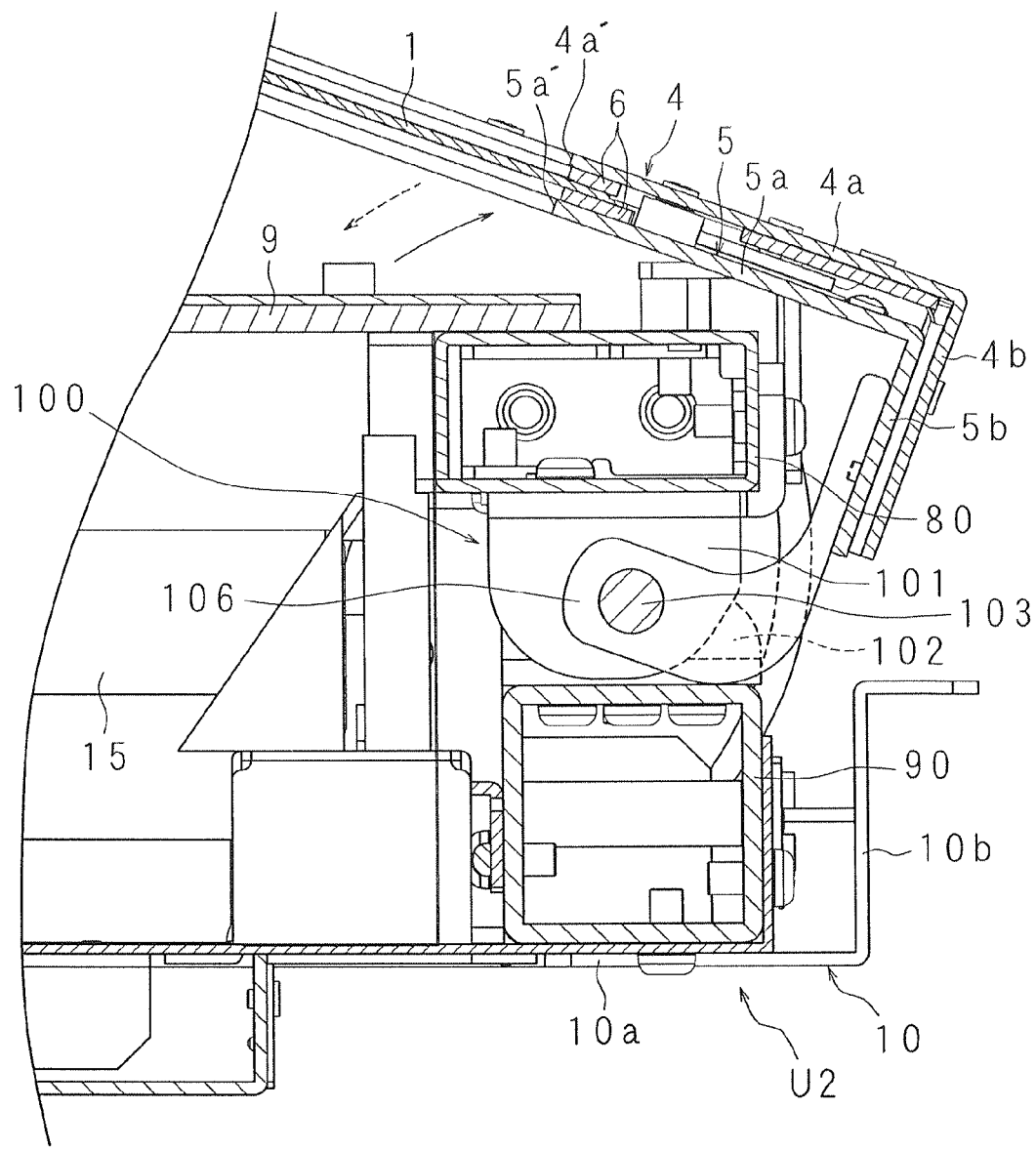
FIG. 16 is an explanatory view for explaining the pivoting of the pivotal member in the liquid crystal display device according to the second embodiment.
Figure 17:
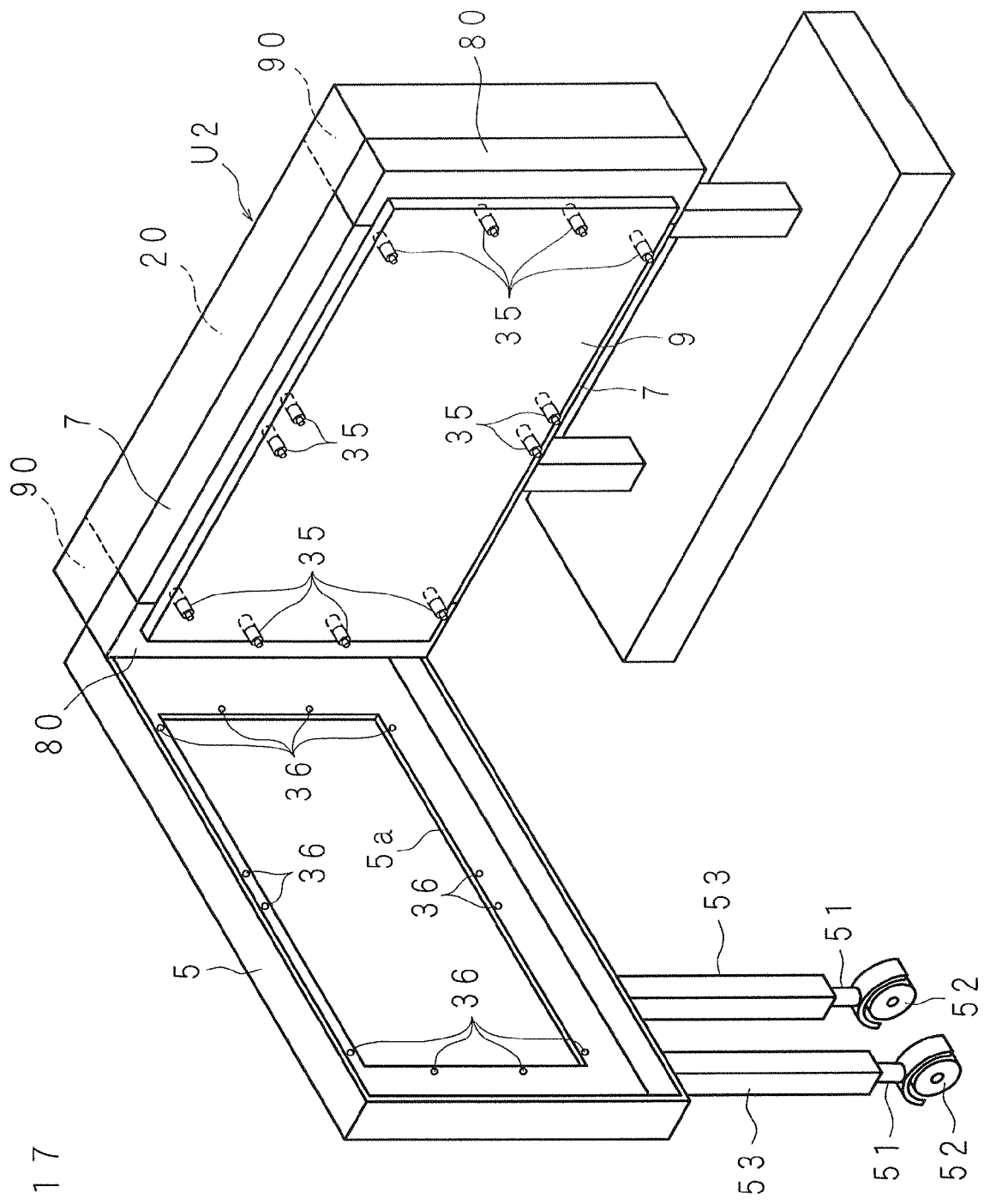
FIG. 17 is a schematic view showing a condition where the optical sheet is exposed in the liquid crystal display device according to the second embodiment.

Hereinafter, the present invention will be described in detail based on the drawings showing a liquid crystal display device according to a second embodiment. FIG. 11 is a schematic vertical cross-sectional view of the liquid crystal display device from which the frame is detached. FIG. 12 is a schematic vertical cross-sectional view of the liquid crystal display device from which the frame is detached. FIG. 13 is a schematic front view of the liquid crystal display device in a condition where the frame is detached. FIG. 14 is a schematic exploded perspective view showing the pivotal member. FIG. 15 is a schematic horizontal cross-sectional view of the liquid crystal display device. FIG. 16 is an explanatory view for explaining the pivoting of the pivotal member. FIG. 17 is a schematic view showing a condition where the optical sheet is exposed.

As shown in FIGS. 11, 12 and 17, a plurality of stepped bosses 35 protrude forward on the front side of the first reinforcing members 80 and the sheet side reinforcing members 7. The stepped boss 35 is provided with a large-diameter cylindrical portion 35a protruding from the front side of the first reinforcing members 80 or the sheet side reinforcing members 7 and a small-diameter cylindrical portion 35b continuous with an end of the large-diameter cylindrical portion 35a.

Through holes corresponding to the stepped bosses 35 are formed in the periphery of the optical sheet 9. The stepped busses 35 are inserted in the through holes to thereby attach the optical sheet 9. The sheet support plates 8 are disposed on the front side of the optical sheet 9, and the sheet support plates 8 are screwed to the first reinforcing members 80 and the sheet side reinforcing members 7 by screws 8a to thereby fix the optical sheet 9.

Moreover, as shown in FIGS. 11 and 17, positioning holes 36 corresponding to the stepped bosses 35 are formed in the annular plate portion 5a. The diameter of the positioning hole 36 is matched to the diameter of the small-diameter cylindrical portion 35b, and the small-diameter cylindrical portion 35b is inserted in the positioning hole 36. The stepped boss 35 and the positioning hole 36 function as a positioning member that aligns the positions of the display panel 1, and the sheet side reinforcing member 7 and the first reinforcing member 80.

Next, the structure of the pivotal member 100 will be described. As shown in FIG. 14, the pivotal member 100 is provided with a third fixed portion 106. The third fixed portion 106 is provided with a rectangular third fixed plate portion 106a fixed to the inner surface of the angular tube portion 5b. A third extending plate portion 106b perpendicular to the third fixed plate portion 106a extends from an end portion of one edge portion of the third fixed plate portion 106a. A third extending plate portion 106c opposed to the extending plate portion 106b and perpendicular to the third fixed plate portion 106a extends from an end portion of the other edge portion of the third fixed plate portion 106a. A through hole 106d is formed in the third extending plate portion 106b, and a through hole 106e corresponding to the through hole 106d is formed in the third extending plate portion 106c. The distance from the third extending plate portion 106b to the third extending plate portion 106c is longer than the distance from the first extending plate portion 101b to the first extending plate portion 101c.

The positions of the through holes 106d and 106e, the through holes 102d and 102e and the through holes 101d and 101e are aligned with one another, and the shaft member 103 is inserted in the through holes.

When the male screw A is detached from the cylindrical portion 71b and a forward force is applied to the bezel 4, the display panel 1 and the frame 5, as shown by the solid arrow in FIG. 16, the third fixed portion 106 is pivoted through the shaft member 103, so that the bezel 4, the display panel 1 and the frame 5 are separated from the optical sheet 9. When a backward force is applied to the bezel 4, the display panel 1 and the frame 5, as shown by the broken arrow in FIG. 16, the bezel 4, the display panel 1 and the frame 5 approach the optical sheet 9. Not only the damper 30 but also the male screw A functions as the restricting member that restricts the pivoting of the display panel 1.

Next, the method of replacing the optical sheet 9 will be described.

First, the male screw A is detached from the cylindrical portion 71b, and the the bezel 4, the display panel 1 and the frame 5 are separated from the optical sheet 9 to thereby expose the optical sheet 9 (see FIG. 13). Then, the screws 8a are detached, and the sheet support plates 8 are detached (see FIG. 17). Then, the optical sheet 9 is detached from the stepped bosses 35, and replaced with a new optical sheet 9.

When the replacement is finished, the sheet support plates 8 are attached, and the bezel 4, the display panel 1 and the frame 5 are brought close to the optical sheet 9. At this time, the stepped bosses 35 are inserted in the positioning holes 36 to thereby position the frame 5 and the optical sheet 9.

When the engagement by the damper 30 is released with the male screw A being engaged with the cylindrical portion 71b, as in the first embodiment, the fluorescent tube 15 can be exposed by separating the optical sheet 9 and the backlight chassis 10.

In the liquid crystal display device according to the second embodiment, the display panel 1, the optical sheet 9 and the backlight chassis 10 are coupled to the pivotal member 100, and the display panel 1, the optical sheet 9 and the backlight chassis 10 are separated from one another without the display panel 1, the optical sheet 9 and the backlight chassis 10 being detached. For example, by separating the display panel 1 and the optical sheet 9 from each other, the optical sheet 9 can be replaced by a small number of persons in a short time without the display panel 1 being detached. When the display panel 1 and the optical sheet 9 are separated, the liquid crystal display device can be prevented from being deformed by the weight of the display panel 1 by loading the first reinforcing member 80 and the second reinforcing member 90 with the weight of the display panel 1.

When the fluorescent tube 15 is replaced, by engaging the screw A with the cylindrical portion 71b, the display panel 1 and the optical sheet 9 are coupled to thereby restrict independent pivoting of the display panel 1, and only the optical sheet 9 and the backlight chassis 10 are separated. By doing this, the fluorescent tube 15 can be smoothly replaced. When the replacement or the maintenance of the optical sheet 9 is performed, the male screw A is detached from the cylindrical portion 71b with the damper 30 being engaged, and only the display panel 1 and the optical sheet 9 are separated. By doing this, the optical sheet 9 can be smoothly replaced. Thus, the members to be separated can be selected as required.

When the replacement of the optical sheet 9 is finished and the bezel 4, the display panel 1 and the frame 5 are brought close to the optical sheet 9, the positions of the frame 5 and the optical sheet 9 can be aligned by inserting the stepped boss 35 in the positioning hole 36.

Of the elements of the liquid crystal display device according to the second embodiment, the same elements as those of the first embodiment are denoted by the same reference numerals and detailed descriptions thereof are omitted.

(Third Embodiment)

Figure 18:
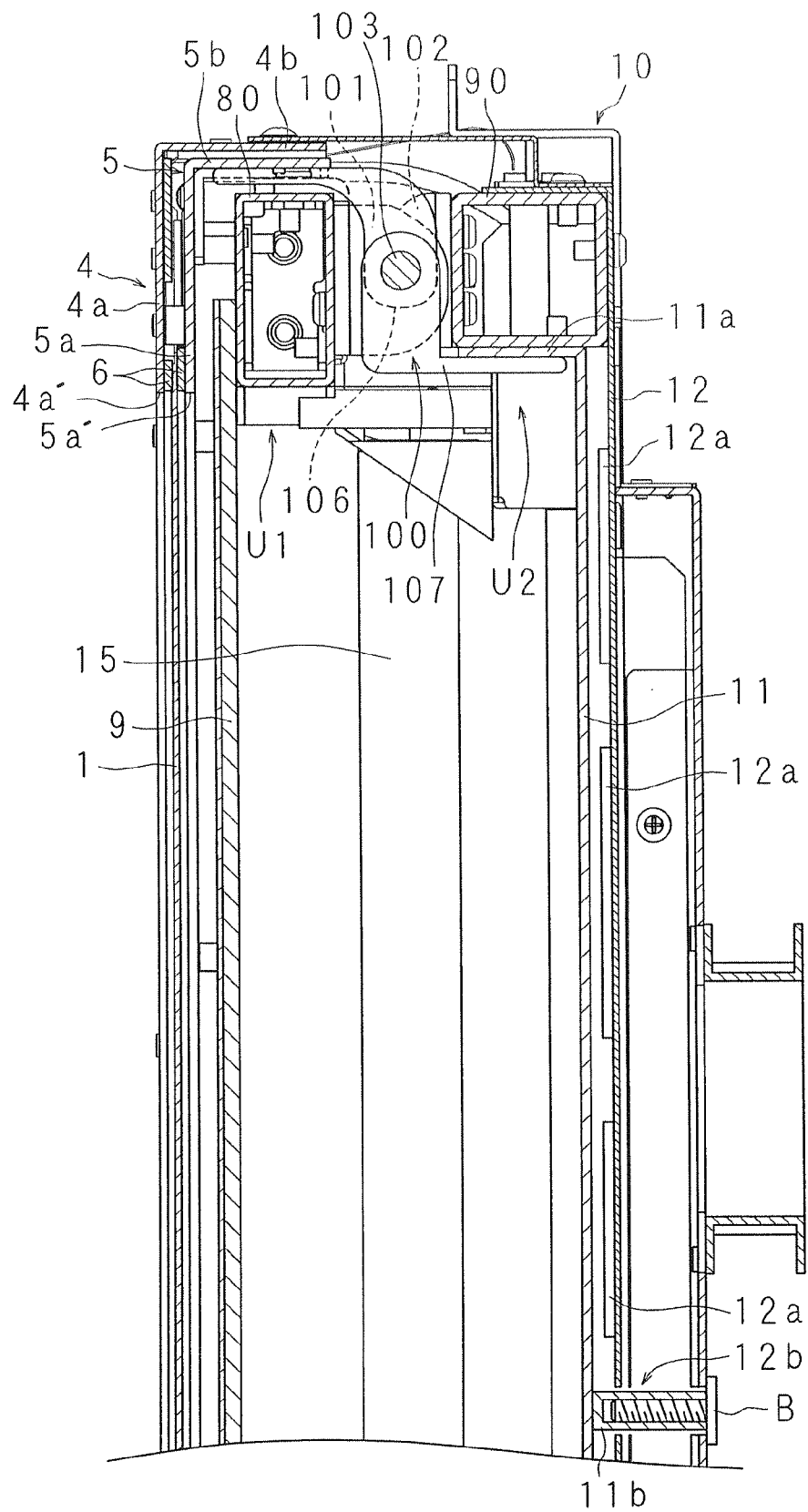
FIG. 18 is a schematic horizontal cross-sectional view of a liquid crystal display device according to a third embodiment.
Figure 19:
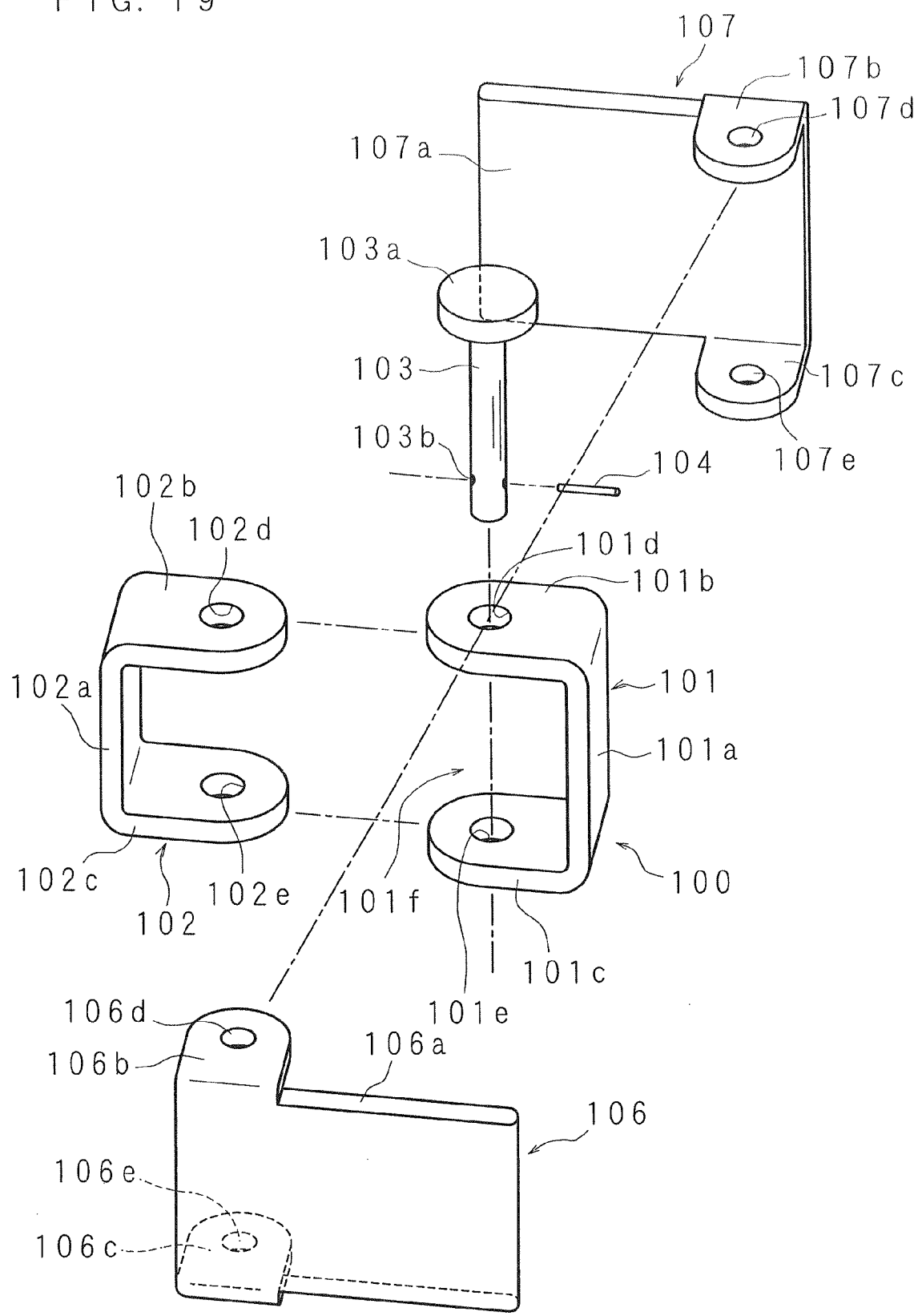
FIG. 19 is a schematic exploded perspective view showing a pivotal member in the liquid crystal display device according to the third embodiment.
Figure 20:
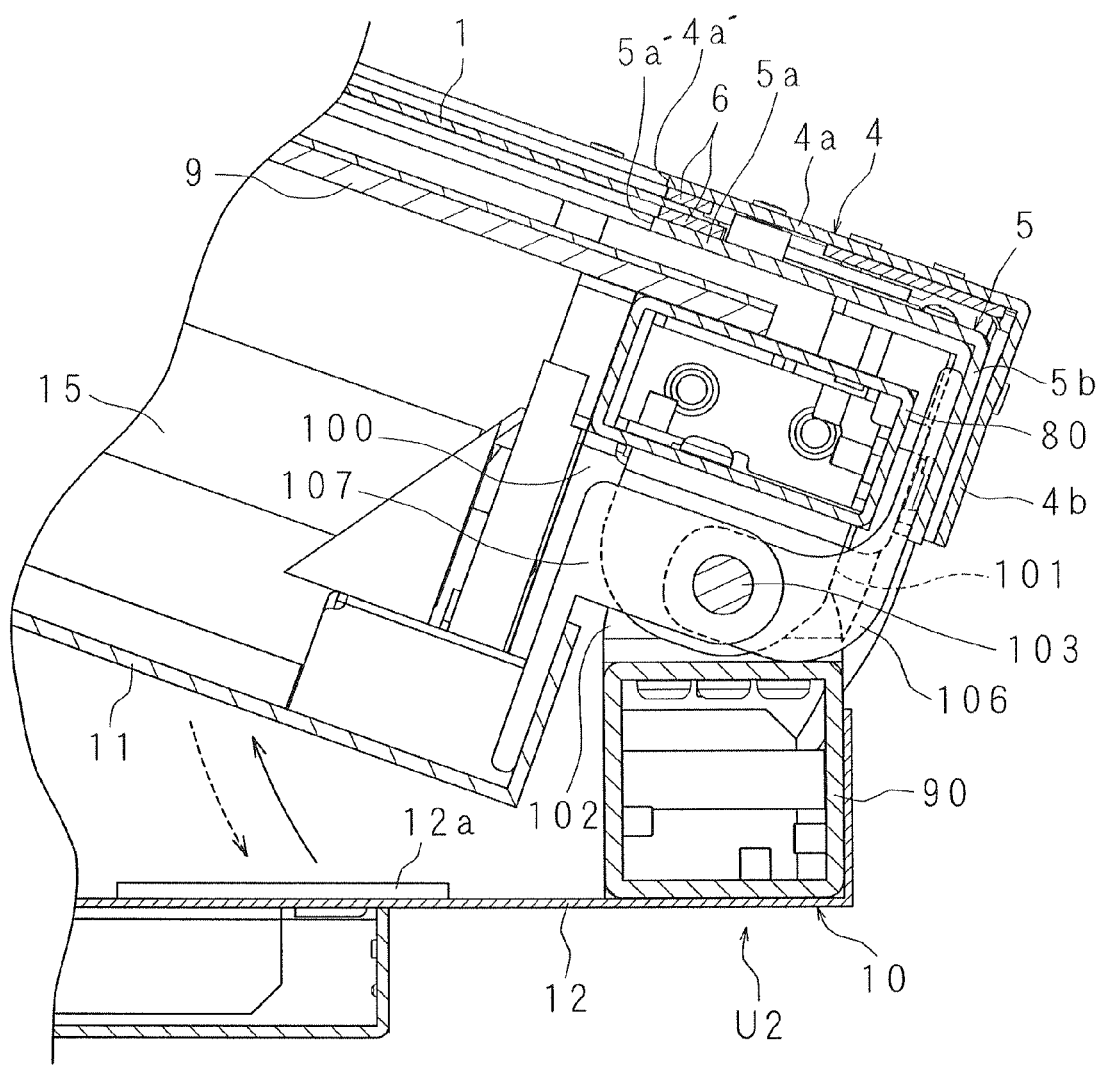
FIG. 20 is an explanatory view for explaining the pivoting of the pivotal member in the liquid crystal display device according to the third embodiment.

Hereinafter, the present invention will be described in detail based on the drawings showing a liquid crystal display device according to a third embodiment. FIG. 18 is a schematic horizontal cross-sectional view of the liquid crystal display device. FIG. 19 is a schematic exploded perspective view showing a pivotal member in the liquid crystal display device. FIG. 20 is an explanatory view for explaining the pivoting of the pivotal member in the liquid crystal display device.

The backlight chassis 10 is provided with a rectangular first chassis portion 11 for attaching the fluorescent tube 15 and a rectangular second chassis portion 12 for attaching a circuit board 12a. The first chassis portion 11 is disposed on the back side of the chassis side reinforcing member 20, and the fluorescent tube 15 is attached to the front side of the first chassis portion 11. A side plate portion 11a extending forward is formed on the left side portion of the first chassis portion 11. The side plate portion 11a vertically adjoins the second reinforcing member 90.

The second chassis portion 12 is opposed to the first chassis portion 11 on the back side of the first chassis portion 11. A plurality of circuit boards 12a for driving the liquid crystal display device are attached to the front side of the second chassis portion 12. The circuit boards 12a are disposed between the first chassis portion 11 and the second chassis portion 12.

A through hole 12b is formed in the second chassis portion 12, and a cylindrical boss portion 11b having a bottom and corresponding to the through hole 12b protrudes from the back side of the first chassis portion 11. The boss portion 11b is inserted in the through hole 12b, and a female screw is formed on the inner surface of the boss portion 11b. A male screw B is engaged with the female screw to thereby fix the first chassis portion 11 and the second chassis portion 12.

The left side surface of the side plate portion 11a vertically adjoins the second reinforcing member 90. A fourth fixed portion 107 is coupled to the right side surface of the side plate portion 11a.

Next, the structure of the pivotal member 100 will be described. As shown in FIG. 19, the pivotal member 100 is provided with the fourth fixed portion 107. The fourth fixed portion 107 is provided with a rectangular fourth fixed plate portion 107a fixed to the right side surface of the side plate portion 11a. A fourth extending plate portion 107b perpendicular to the fourth fixed plate portion 107a extends from an end portion of one edge portion of the fourth fixed plate portion 107a. A fourth extending plate portion 107c opposed to the extending plate portion 107b and perpendicular to the fourth fixed plate portion 107a extends from an end portion of the other edge portion of the fourth fixed plate portion 107a. A through hole 107d is formed in the fourth extending plate portion 107b, and a through hole 107e corresponding to the through hole 107d is formed in the fourth extending plate portion 107c. The distance from the fourth extending plate portion 107b to the fourth extending plate portion 107c is longer than the distance from the third extending plate portion 106b to the third extending plate portion 106c.

The positions of the through holes 107d and 170e, the through holes 106d and 106e, the through holes 102d and 102e and the through holes 101d and 101e are aligned with one another, and the shaft member 103 is inserted in the through holes.

When the male screw B is detached from the boss portion 11b and a forward force is applied to the first chassis portion 11, as shown by the solid arrow in FIG. 20, the fourth fixed portion 107 is pivoted through the shaft member 103, so that the first chassis portion 11 is separated from the second chassis portion 12. When a backward force is applied to the first chassis portion 11, as shown by the broken arrow in FIG. 20, the first chassis portion 11 approaches the second chassis portion 12.

In the liquid crystal display device according to the third embodiment, when the circuit board 12a is replaced, by pivoting the first chassis portion 11, the first chassis portion 11 and the second chassis portion 12 can be separated without the second chassis portion 12 being detached. When the replacement of the circuit board 12a is finished, the first chassis portion 11 and the second chassis portion 12 can be brought close to each other. By doing this, the circuit board 12a disposed between the first chassis portion 11 and the second chassis portion 12 can be replaced by a small number of persons in a short time. Moreover, when the first chassis portion 11 is pivoted, the second chassis portion 12 can be prevented from being deformed by loading the second reinforcing member 90 with the weight of the first chassis portion 11.

When neither the replacement nor the maintenance of the circuit board 12a disposed between the first chassis portion 11 and the second chassis portion 12 is performed, the pivoting of the first chassis portion 11 is restricted by the male screw B, and only when the replacement or the maintenance of the circuit board 12a disposed between the first chassis portion 11 and the second chassis portion 12 is performed, the first chassis portion 11 can be pivoted.

When the first chassis portion 11 and the second chassis portion 12 are brought close to each other, the positions of the first chassis portion 11 and the second chassis portion 12 can be aligned by inserting the boss 11b in the through hole 12b.

In the liquid crystal display device according to the third embodiment, non-illustrated leg portions and casters are attached to the first chassis portion 11. While the circuit board 12a is attached to the second chassis portion 12 in the liquid crystal display device according to the third embodiment, a circuit board may be attached to the back side of the first chassis portion 11.

Of the elements of the liquid crystal display device according to the third embodiment, the same elements as those of the first or second embodiment are denoted by the same reference numerals and detailed descriptions thereof are omitted.

(Fourth Embodiment)

Figure 21:
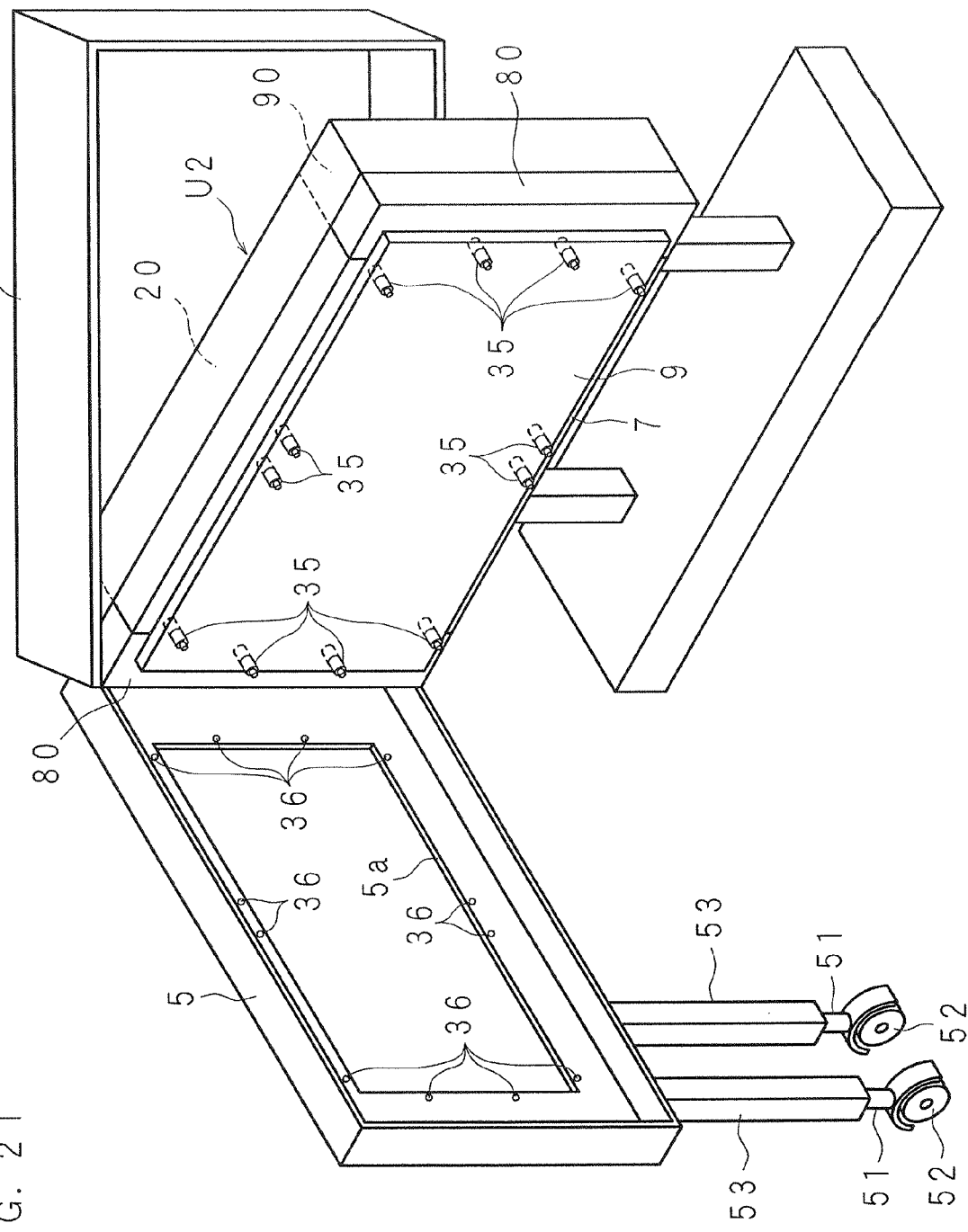
FIG. 21 is a schematic perspective view showing a condition where a frame and an optical sheet are separated from each other and a condition where a rear cabinet and a backlight chassis are separated in a liquid crystal display device according to a fourth embodiment.

Hereinafter, the present invention will be described in detail based on the drawings showing a liquid crystal display device according to a fourth embodiment. FIG. 21 is a schematic perspective view showing a condition where a frame and an optical sheet are separated and a condition where a rear cabinet and a backlight chassis are separated.

A rectangular rear cabinet 13 is provided on the back side of the backlight chassis 10. The pivotal member 100 is provided with a non-illustrated fifth fixed member, and the fifth fixed member is coupled to the left side portion of the rear cabinet 13. The rear cabinet 13 pivots on the left side portion.

In the liquid crystal display device according to the fourth embodiment, by pivoting the rear cabinet 13 situated on the back side of the backlight chassis 10 without detaching the rear cabinet 13, the rear cabinet 13 and the backlight chassis 10 are separated. By doing this, a part disposed between the rear cabinet 13 and the backlight chassis 10, for example, a circuit board attached to the back side of the backlight chassis 10 can be replaced by a small number of persons in a short time. When the replacement of the circuit board is finished, the rear cabinet 13 and the backlight chassis 10 can be brought close to each other. Moreover, when the rear cabinet 13 is pivoted, the backlight chassis 10 can be prevented from being deformed by loading the second reinforcing member 90 with the weight of the rear cabinet 13.

Of the elements of the liquid crystal display device according to the fourth embodiment, the same elements as those of the first to third embodiments are denoted by the same reference numerals and detailed descriptions thereof are omitted.

(Fifth Embodiment)

Figure 22:
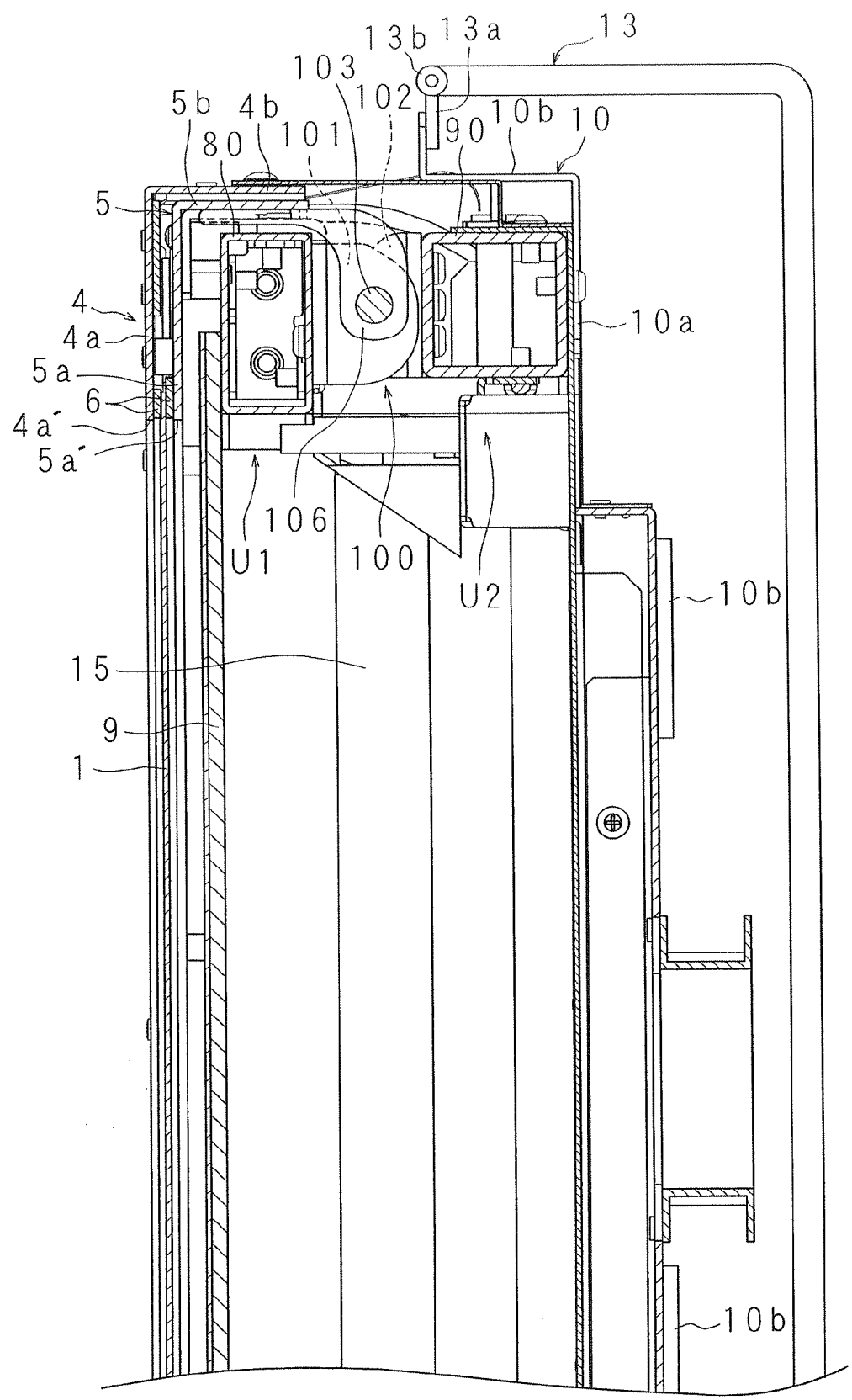
FIG. 22 is a schematic horizontal cross-sectional view of a liquid crystal display device according to a fifth embodiment.
Figure 23:
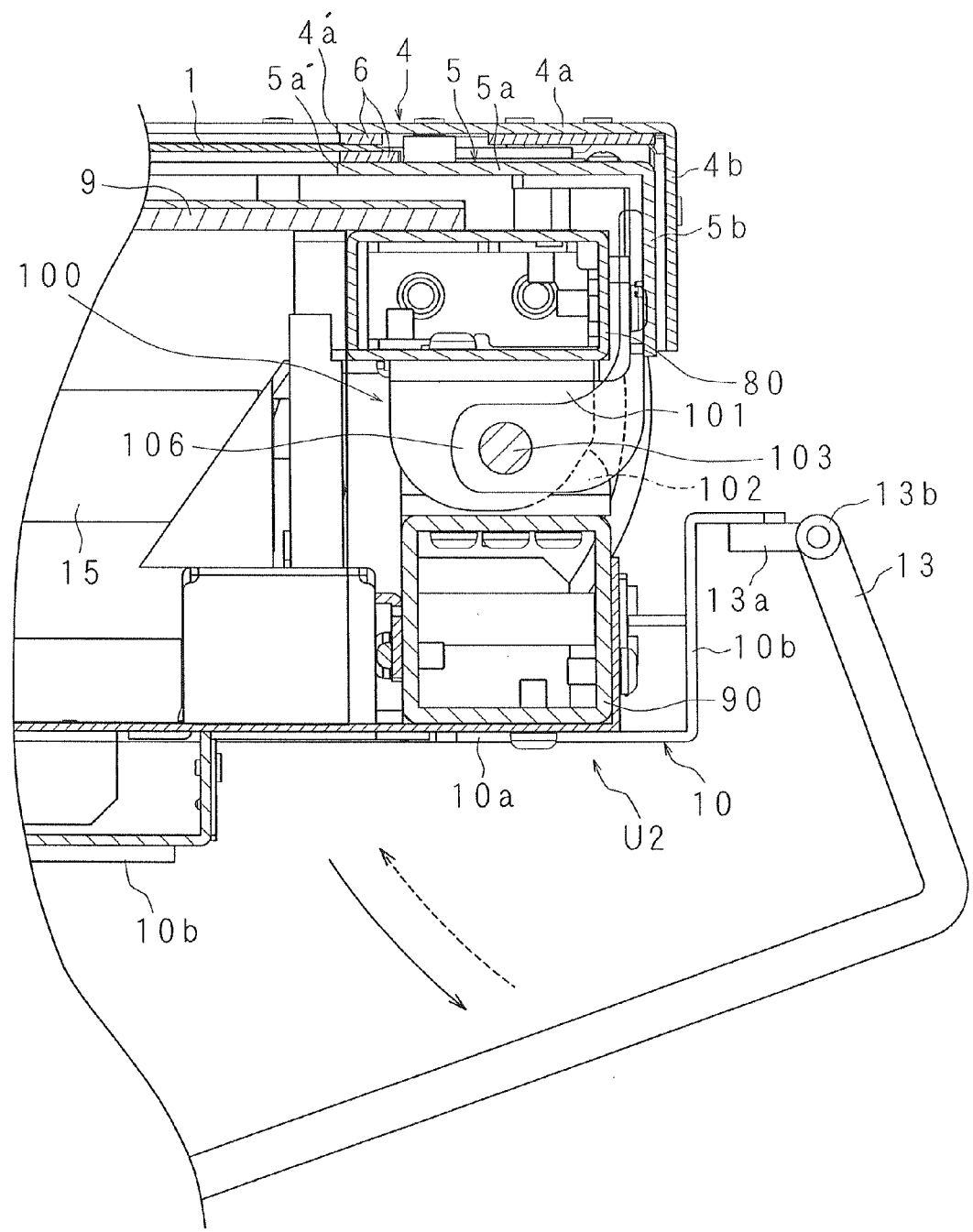
FIG. 23 is an explanatory view for explaining the pivoting of the pivotal member in the liquid crystal display device according to the fifth embodiment.
Figure 24:
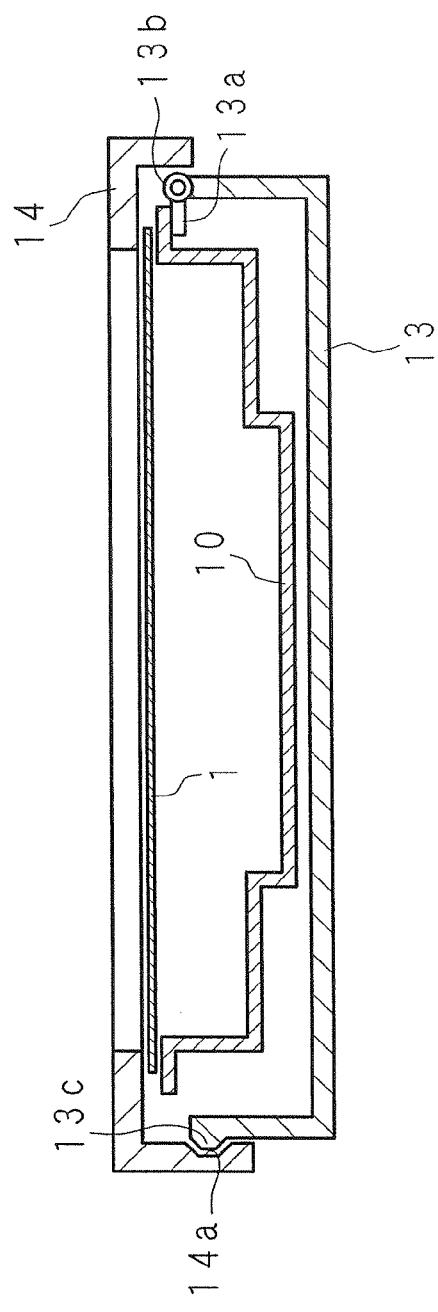
FIGS. 24A and 24B are schematic horizontal cross-sectional views for explaining the engagement between a claw portion and an engagement concave portion in the liquid crystal display device according to the fifth embodiment.
Figure 24:
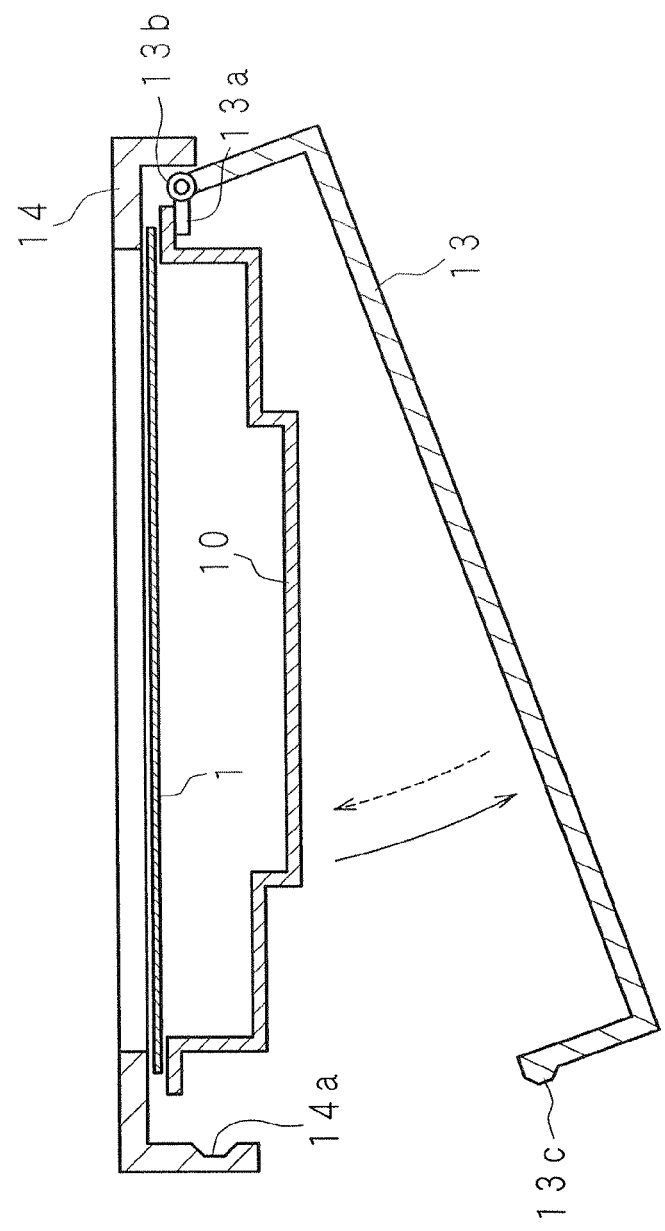

Hereinafter, the present invention will be described in detail based on the drawings showing a liquid crystal display device according to a fifth embodiment. FIG. 22 is a schematic horizontal cross-sectional view of the liquid crystal display device. FIG. 23 is an explanatory view for explaining the pivoting of the pivotal member in the liquid crystal display device. FIGS. 24A and 24B are schematic horizontal cross-sectional views for explaining the engagement between a claw portion and an engagement concave portion.

A plurality of hinge support rods 13a are vertically juxtaposed on the left side surface of the backlight chassis 10. The hinge support rods 13a protrude leftward, and a plurality of hinge members 13b are supported by the protrusion ends of the hinge support rods 13a, respectively. The left side portion of the box-shaped rear cabinet 13 is coupled to the hinge members 13b. A claw portion 13c protruding rightward is provided on the right side portion of the rear cabinet 13. A box-shaped front cabinet 14 having an opening corresponding to the display panel 1 is provided on the front side of the display panel 1. The lateral size of the front cabinet 14 is larger than that of the rear cabinet 13, and the rear cabinet 13 is situated inside the front cabinet 14. An engagement concave portion 14a is provided inside the right side portion of the front cabinet 14, and as shown in FIG. 24A, the claw portion 13c is engaged with the engagement concave portion 14a. A plurality of circuit boards 10b are attached to the back side of the backlight chassis 10.

When the claw portion 13c is detached from the engagement concave portion 14a and a backward force is applied to the rear cabinet 13, as shown by the solid arrows in FIGS. 23 and 24B, the rear cabinet 13 is pivoted through the hinge member 13b, so that the backlight chassis 10 and the rear cabinet 13 are separated. When a forward force is applied to the rear cabinet 13, as shown by the broken line in FIGS. 23 and 24B, the backlight chassis 10 and the rear cabinet 13 are brought close to each other.

In the liquid crystal display device according to the fifth embodiment, when the circuit boards 10b are replaced, the rear cabinet 13 and the backlight chassis 10 are separated by pivoting the rear cabinet 13 situated on the back side of the backlight chassis 10 without detaching the rear cabinet 13. When the replacement of the circuit boards 10b is finished, the backlight chassis 10 and the rear cabinet 13 are brought close to each other. By doing this, the circuit boards 10b attached to the back side of the backlight chassis 10 can be replaced by a small number of persons in a short time.

While the circuit board 10b is attached to the back side of the backlight chassis 10 in the liquid crystal display device according to the fifth embodiment, the circuit board may be attached to the front side of the rear cabinet 13.

Of the elements of the liquid crystal display device according to the fifth embodiment, the same elements as those of the first to fourth embodiments are denoted by the same reference numerals and detailed descriptions thereof are omitted.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims

The invention claimed is:

1. A display device comprising:
a display panel that displays an image;
a support portion that supports the display panel; and
a pivotal member that couples the display panel and the support portion such that the display panel pivots on a side portion of the display panel,
wherein the support portion includes a chassis that supports a luminous body,
the display device further comprising:
an optical sheet disposed between the display panel and the chassis and diffuses light of the luminous body,
wherein the optical sheet is coupled to the pivotal member.

2. The display device according to claim 1, further comprising:
a rod member provided on the side portion of the display panel or on a part of the support portion opposed to the side portion of the display panel,
wherein the pivotal member is coupled to the rod member.

3. The display device according to claim 1, further comprising:
a restricting member that restricts pivoting of the display panel.

4. The display device according to claim 1, further comprising:
a positioning member that aligns positions of the display panel and the support portion.

5. The display device according to claim 1,
wherein the support portion includes a cabinet situated on a back side of the chassis.

6. The display device according to claim 1,
wherein the chassis includes a first chassis portion for attaching the luminous body and a second chassis portion opposed to the first chassis portion.

7. The display device according to claim 1,
wherein the chassis is rectangular,
the display device further comprising:
a rectangular cabinet opposed to the chassis; and
a coupling member that couples a side portion of the cabinet and a side portion of the chassis opposed to the side portion of the cabinet so as to be pivotable.

8. The display device according to claim 1, further comprising:
a leg portion attached to the support portion; and
an attachment/detachment portion for attaching and detaching the leg portion.

9. The display device according to claim 8,
wherein a rolling member is provided on an end portion of the leg portion.

10. A display device according comprising:
a display panel that displays an image;
a support portion that supports the display panel; and
a pivotal member that couples the display panel and the support portion such that the display panel pivots on a side portion of the display panel,
wherein the support portion includes a chassis that supports a luminous body,
the display device further comprising:
an optical sheet disposed between the display panel and the chassis and diffuses light of the luminous body,
wherein the chassis includes a first chassis portion for attaching the luminous body and a second chassis portion opposed to the first chassis portion,
the display device further comprising:
a chassis restricting member that restricts pivoting of the first chassis portion.

11. A display device comprising:
a display panel that displays an image;
a support portion that supports the display panel; and
a pivotal member that couples the display panel and the support portion such that the display panel pivots on a side portion of the display panel,
wherein the support portion includes a chassis that supports a luminous body,
the display device further comprising:
an optical sheet disposed between the display panel and the chassis and diffuses light of the luminous body,
wherein the chassis includes a first chassis portion for attaching the luminous body and a second chassis portion opposed to the first chassis portion,
the display device further comprising:
a chassis alignment member that aligns positions of the first chassis portion and the second chassis portion.

12. A display device comprising:
a frame body provided on a front side of a display panel that displays an image;
a panel support body provided on a back side of the display panel and supports the display panel;
a chassis provided on a back side of the panel support body and supports a luminous body;
an optical sheet that diffuses light of the luminous body and irradiates the display panel with the light, the frame body, the display panel, the panel support body and the optical sheet being coupled;
a first rod member along an edge portion of the optical sheet;
a second rod member along an edge portion of the chassis and opposed to the first rod member; and
a pivotal member that couples the first rod member and the second rod member so that the optical sheet pivots on a side of the first rod member.

13. The display device according to claim 12,
wherein the pivotal member includes
a first fixed portion having a through hole and fixed to a second rod member side of the first rod member;
a second fixed portion having a through hole and fixed to a first rod member side of the second rod member;
a concave portion provided on a second rod member side of the first fixed portion and/or a first rod member side of the second fixed portion; and
a shaft member inserted in the through holes formed in the first fixed portion and the second fixed portion to thereby couple the first fixed portion and the second fixed portion while one of the first fixed portion and the second fixed portion is disposed in the concave portion provided on the other of the first fixed portion and the second fixed portion.

14. The display device according to claim 12,
wherein the pivotal member includes a first fixed plate portion fixed to a second rod member side of the first rod member;

two first extending plate portions having a through hole and extending from one edge portion of the first fixed plate portion and the other edge portion opposed to the one edge portion toward the second rod member vertically to a direction of a shaft center of the first rod member;

a second fixed plate portion fixed to a first rod member side of the second rod member;

two second extending plate portions having a through hole and extending from one edge portion of the second fixed plate portion and the other edge portion opposed to the one edge portion toward the first rod member vertically to a direction of a shaft center of the second rod member; and a shaft member inserted in the through holes of the first extending plate portion and the second extending plate portion to thereby couple the first extending plate portion and the second extending plate portion.

15. The display device according to claim 12, further comprising:

a leg portion attached to the panel support body; and an attachment/detachment portion for attaching and detaching the leg portion.

16. The display device according to claim 15, wherein a rolling member is provided on an end portion of the leg portion.

17. The display device according to claim 12, wherein the first rod member and the second rod member are cylindrical.

* * * * *